(12) United States Patent
Wittenburg et al.

(10) Patent No.: US 6,515,656 B1
(45) Date of Patent: Feb. 4, 2003

(54) SYNCHRONIZED SPATIAL-TEMPORAL BROWSING OF IMAGES FOR ASSESSMENT OF CONTENT

(75) Inventors: Kent Barrows Wittenburg, Lynnfield, MA (US); Thomas Richard Lanning, Littleton, MA (US); Wissam Yussef Ali-Ahmad, Somerville, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/302,874

(22) Filed: Apr. 30, 1999

Related U.S. Application Data
(60) Provisional application No. 60/129,297, filed on Apr. 14, 1999.

(51) Int. Cl.[7] ............................................. G06F 17/21
(52) U.S. Cl. .................... 345/302; 707/501.1; 345/853; 345/854; 705/27
(58) Field of Search .................... 345/339, 355, 345/356, 302, 328, 760, 853, 854, 730–732; 705/27; 707/501, 500.1, 501.1, 513

(56) References Cited

U.S. PATENT DOCUMENTS

| | | | | |
|---|---|---|---|---|
| 5,395,243 A | * | 3/1995 | Lubin et al. | 434/118 |
| 5,440,678 A | * | 8/1995 | Eisen et al. | 707/537 |
| 5,451,998 A | * | 9/1995 | Hamrick | 348/13 |
| 5,519,828 A | * | 5/1996 | Rayner | 345/723 |
| 5,526,480 A | * | 6/1996 | Gibson | 345/302 |
| 5,644,737 A | * | 7/1997 | Tuniman et al. | 345/352 |
| 5,649,234 A | * | 7/1997 | Klappert et al. | 345/302 |
| 5,678,015 A | * | 10/1997 | Goh | 345/340 |
| 5,734,805 A | * | 3/1998 | Isensee et al. | 345/419 |
| 5,786,818 A | * | 7/1998 | Brewer et al. | 345/339 |
| 5,786,820 A | * | 7/1998 | Robertson | 345/357 |
| 5,815,154 A | * | 9/1998 | Hirschtick et al. | 345/356 |
| 5,838,319 A | * | 11/1998 | Greer et al. | 345/340 |
| 5,847,709 A | * | 12/1998 | Card et al. | 345/355 |
| 5,867,177 A | * | 2/1999 | Okuyama et al. | 345/473 |
| 5,933,141 A | * | 8/1999 | Smith | 345/339 |
| 5,953,005 A | * | 9/1999 | Liu | 345/302 |
| 5,959,621 A | * | 9/1999 | Nawaz et al. | 345/329 |
| 6,008,807 A | * | 12/1999 | Bretschneider et al. | 345/339 |
| 6,009,429 A | * | 12/1999 | Greer et al. | 707/10 |
| 6,016,145 A | * | 1/2000 | Horvitz et al. | 345/342 |
| 6,028,600 A | * | 2/2000 | Rosin et al. | 345/327 |
| 6,049,333 A | * | 4/2000 | LaJoie et al. | 345/328 |
| 6,084,582 A | * | 7/2000 | Qureshi et al. | 345/302 |
| 6,144,991 A | * | 11/2000 | England | 345/733 |
| 6,226,655 B1 | * | 5/2001 | Borman et al. | 707/501 |
| 6,301,586 B1 | * | 10/2001 | Yang et al. | 705/27 |
| 6,342,904 B1 | * | 1/2002 | Vasudevan et al. | 345/716 |

FOREIGN PATENT DOCUMENTS

| | | |
|---|---|---|
| WO | WO 9803963 A2 * | 1/1998 |
| WO | WO 9856188 A2 * | 12/1998 |

OTHER PUBLICATIONS

Enarsson, Magnus. "ET Message Scroll" (version 2.1, Java™ applet). Submitted Jun. 7, 1998 to jars.com.*

Tze, Jay. "ISCUpScroll" (Java™ applet). Mecklermedia Corporation, ®1998. Found at javaboutique.internet.com.*

(List continued on next page.)

*Primary Examiner*—Joseph H. Feild
(74) *Attorney, Agent, or Firm*—Leonard Charles Suchyta; James K. Weixel

(57) ABSTRACT

A method and apparatus for viewing multimedia-based information in accordance with user controls for the speed and direction of the multimedia presentation. Different techniques for presenting multimedia data items are disclosed. User controls provide control for speed and direction in accordance with a user selection device being in a particular location. When a user device is within the defined area, the speed and direction control are turned on. When the user device leaves the defined area, the speed and direction are turned off.

75 Claims, 16 Drawing Sheets

OTHER PUBLICATIONS

"Avalon to Incorporate Microsoft's NetMeeting™ into BRIGHTLight™" (Press Release dated Mar. 31, 1998). Found at www.atlantis.com/avalon/anew/htm.*

Simmons, Dale. "Just–in–Time Knowledge" (conference paper). Delivered Mar. 18, 1997. Found at www.atlantis.com/avalon/perfpara.htm.*

Darnell, Daniel P. "Ultimate Solitaire!" (Java™ applet). Found at ourworld.compuserve.com/homepages/d_jdarnell/solapp.htm via jars.com search. ®1997.*

J.D. Hollan, et al., "Information Visualization", *Handbook of Human–Computer Interaction, North Holland*, pp. 33–48 M.G. Helander, T.K. Landauer, and P.V. Prabhu (eds.) (1997).

A. Kerne, "Collage Machine: Temporality and Indeterminacy in Media Browsing Via Interface Ecology", *Proceedings of CHI '97: Human Factors in Computing Systems, Extended Abstracts*, ACM Press, pp. 297–298.

A. Komlodi, et al., "Key Frame Preview Techniques for Video Browsing", *Proceedings of Digital Libraries*, ACM Press, pp. 118–125, (USA, 1998).

T. Tse, et al., "A Dynamic Key Frame Presentation Techniques for Augmenting Video Browsing", *Proceedings of AVI '98: Advanced Visual Interfaces*, ACM Press, pp. 185–194, (Italy, 1998).

* cited by examiner

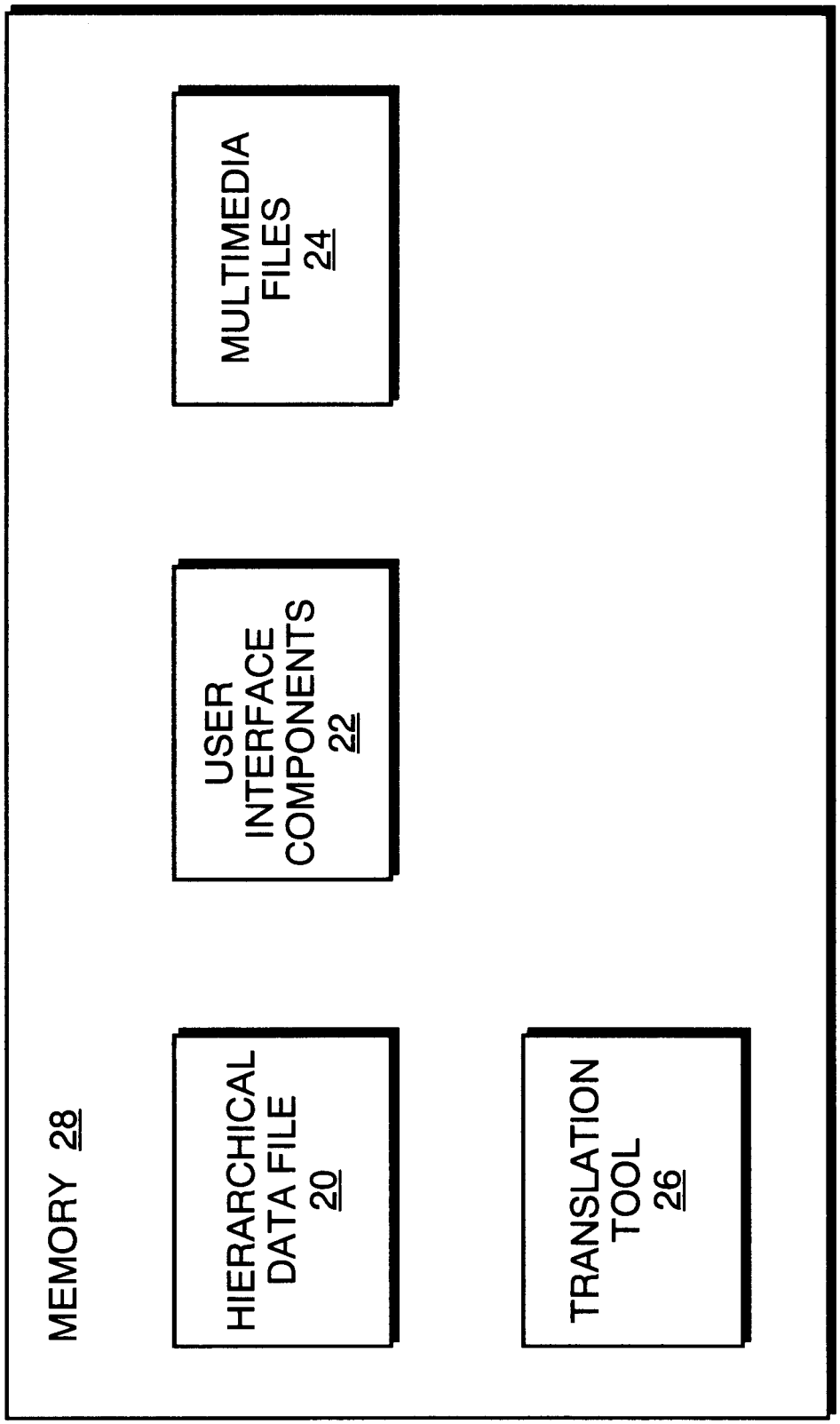

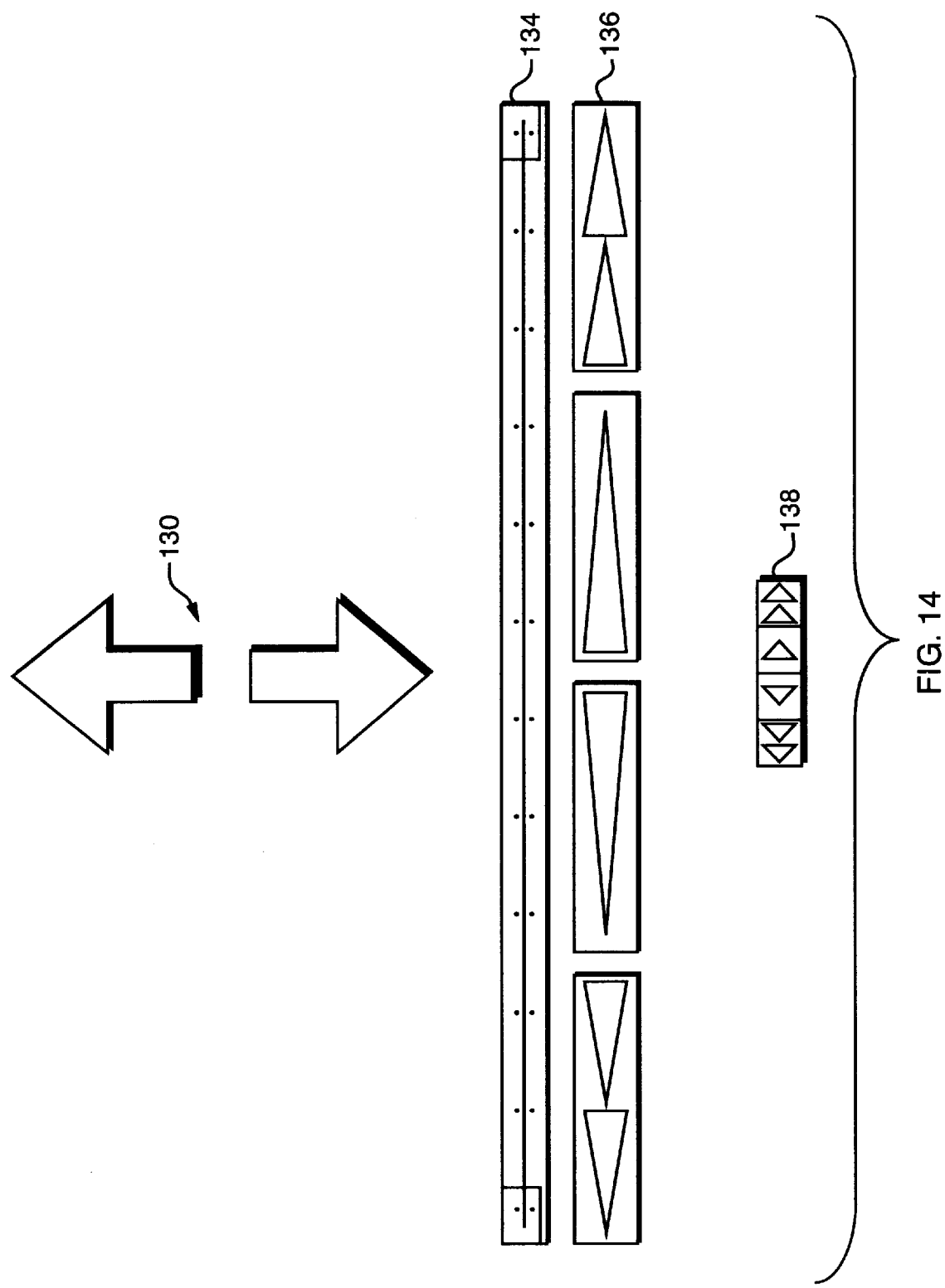

SYNCHRONIZED SPATIAL-TEMPORAL BROWSING OF IMAGES FOR ASSESSMENT OF CONTENT

REFERENCES TO RELATED APPLICATIONS

This application claims priority from U.S. provisional patent application number 60/129,297 filed Apr. 14, 1999.

BACKGROUND

This invention generally relates to computer systems, and more particularly to computer executed techniques for viewing information.

Computer systems may be used in a variety of applications and environments. For example, in commercial applications of computer systems, a computer may assist a user in making a decision or choice based on information that is viewed using the computer. A computer storing information may be used to display information to a user. Subsequently, the user may make a decision or selection in light of the information presented. One of the problems in applications such as these is how to present the information to a user in order to enable efficient and effective scanning through a large amount of material.

Information on computer systems may be presented using different existing techniques. One technique includes a user selection being made by sequentially searching through each alternative. Examples include selection of a television station broadcasting a particular television show by flipping to each channel, or selection of a website based on webpage contents by visiting each website. No additional information other than the content of each alternative is available to make a selection. Only by viewing, for example, each item is the user able to extract any information about a particular website's information, or television program. This has a drawback of a potentially long selection process since a user generally has no additional information available in making a selection other than by "visiting" each alternative.

An improvement to this technique is to provide summaries or abstractions for information objects so that they may be presented to the user more efficiently. Summaries in text form may be employed, allowing users to generally scan through lists more quickly than may be possible by viewing each item in its entirety. A further extension is to categorize the information objects and create hierarchical organizations of the material. Presenting text choices in a linear or hierarchical listing on a computer entails a spatial layout on a screen. If the listing exceeds the size of the display area, users generally interact by either flipping "pages" or else by scrolling with standard computer windowing techniques. While these techniques may make the selection task more efficient, they still have drawbacks. One is that page flipping and/or scrolling requires interaction and cognitive resources and may be slow in certain networked environments. If users have to return to earlier parts of the sequence, they may lose context. Additionally, relying solely on text listings for presenting abstractions of information objects does not make use of imagery and other media. For example, psychological literature generally states that humans are capable of carrying out certain cognitive tasks by viewing images for just milliseconds.

Slide shows represent another technique that may be used to scan through information. With a slide show, images and text are generally presented one screen at a time with backward and forward controls. Some auto-play features of a slide show may also offer control over the temporal speed of the presentation. For example, some software, such as Powerpoint™, may offer the user the option of preselecting a time to control the presentation speed, such as the time display for each slide. Slide shows may take advantage of human cognitive abilities to process imagery. However, there are two main drawbacks with using slide shows for scanning through a set of information objects. First, a slide show is a linear sequence in which only a single slide is shown at a time. There may be applications or forms of information in which it may be valuable to add some visual structure to reflect, say, a hierarchical organization of the material. Second, users are not able to adjust the speed of the information display dynamically. For selection and recognition tasks, it may be valuable for users be able to proceed through a sequence of images at very high rates but then be able to stop instantaneously and/or reverse the sequence.

Collages of images have also been used as a way of presenting information. However, user controls for speed and direction of information presented are not provided.

Thus, there is required a technique for viewing and selecting information by incorporating imagery and other media, as well as text, that uses a hierarchical organization, and deploys controls for speed and direction of information presented.

BRIEF DESCRIPTION OF THE DRAWINGS

The above-mentioned and other features of the invention will now become apparent by reference to the following description taken in connection with the accompanying drawings, in which:

FIG. 2 is an example of a block diagram of software components included in the system of FIG. 1;

FIG. 14 is an example of an embodiment of user controls as included in various user interfaces for the browsing tool.

SUMMARY OF THE INVENTION

In accordance with one aspect of the invention is a method executed in a computer system for presenting information. A hierarchical description of the information is presented in an outline area. One or more multimedia data items are presented in a presentation area. The hierarchical description is synchronized with a first temporal arrangement of the multimedia data items in the presentation area. The speed and direction are controlled for the one or more multimedia data items presented in the presentation area.

In accordance with another aspect of the invention is an apparatus for presenting information. Machine executable code is included for displaying a hierarchical description of the information in an outline area. Machine executable code for presenting one or more multimedia data items in a presentation area is included. The hierarchical description is synchronized with a first temporal arrangement of the one or more multimedia data items in the presentation area. Machine executable code is also included for controlling direction and speed of the one or more multimedia data items presented in the presentation area.

In accordance with yet another aspect of the invention is a method of selecting items for purchase in electronic commerce. A hierarchical description of items for sale in an outline area is presented. One or more multimedia data items are presented identifying said items for sale in a presentation area. The hierarchical description is synchronized with a first temporal arrangement of the one or more multimedia data items in the presentation area. The direction and speed of the one or more multimedia data items presented in said presentation area is controlled. One or said items for sale is selected by selecting one of the one or more multimedia data items corresponding to the one or more items selected.

Thus, there is presented a technique for viewing and selecting information by incorporating imagery and other media, as well as text, that uses a hierarchical organization, and deploys controls for speed and direction of information presented.

DETAILED DESCRIPTION OF THE PREFERRED EMBODIMENT

Figure 1:
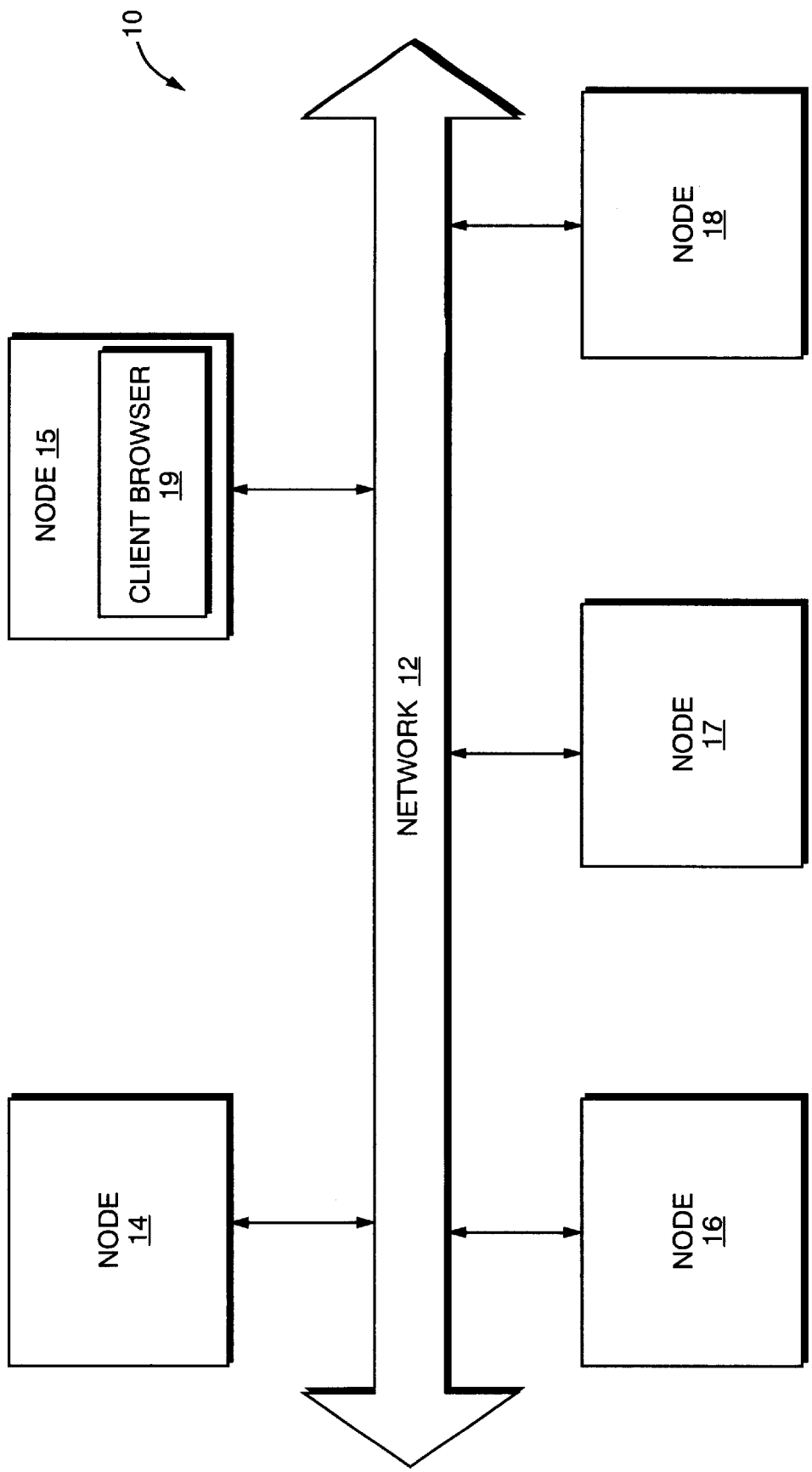
FIG. 1 is an example of an embodiment of a system that includes the invention.

Referring now to FIG. 1, shown is an embodiment of a system that includes the invention. A computer system 10 is shown to include a network 12 by which computer nodes 14–18 may communicate with each other. In the computer systein 10 of FIG. 1, one of the computer nodes, such as node 15, acts as a client node upon which a user executes a client browser 19. The client node 15 communicates with one or more other nodes in the system 10 in which the one or more other nodes in the computer system 10, such as node 14, may act as a server node providing certain functions or responding to certain requests made by the client browser 19 executing in the client node 15.

It should be noted that the system of FIG. 1 may include one or more computer nodes and the nodes, if there are more than one, may communicate through any type of communications medium, such as a network, a hardwire connection, or other means of communication known to those skilled in the art. It should also be noted that each of the computer nodes in the system 10 may be any type of computer processor, such as a commercially available personal computer, or a larger scale multi-user computer system.

Referring now to FIG. 2, shown is an embodiment of various software components that may be included a memory 28 of one or more nodes of the computer system 10 of FIG. 1. Generally, the software components in FIG. 2 may be used to produce the files needed to build a software browsing tool. Additionally, some of the components included in FIG. 2 are files that may be used by the software browsing tool once complete. Generally, the software browsing tool that will be described in paragraphs that follow is a tool providing overviews of dynamically specified data for the purpose of, for example, previewing or assessing data. Generally, the tool presents an organizational structure by which a user may view various data components and objects, such as those associated with image-based and/or multimedia data presentations.

Included in the memory 28 of FIG. 2 is a hierarchical data file 20, user interface components 22, multimedia files 24, and a translation tool 26. The hierarchical data file 20 generally includes a description of the various data components to be presented and viewed by a user in some type of hierarchical organization. In one embodiment, the hierarchical data file 20 may include a list of the various URL files specifying images and/or other multimedia data files to be presented to a user. Additionally, various URLs are grouped together to represent the grouping hierarchy by which these components are to be. presented. For example, the hierarchical data file 20 may include a nesting structure nesting various groups of one or more of the URL files presented to the user. The user interface components 22 generally include software used to produce the user interface displays with the browsing software tool. As will be described in paragraphs that follow, user interface components may include, for example, JAVA Script code and data, and dynamic HTML files. Multimedia data files 24 generally include multimedia data to be presented to the user in conjunction with the user interface. Generally, the multimedia data files include that data which is organized and represented by the hierarchical data file. It should also be noted that other types of data files, such as multimedia data files including audio files may also be included in other embodiments. The translation tool 26 is generally used to produce other pieces of software which are used in displaying the user interface and associated data files. In one embodiment, the translation tool 26 includes JAVA code to produce files which will be described in conjunction with FIG. 3.

It should generally be noted that other embodiments may include additional software components from those described in FIG. 2.

Figure 2A:
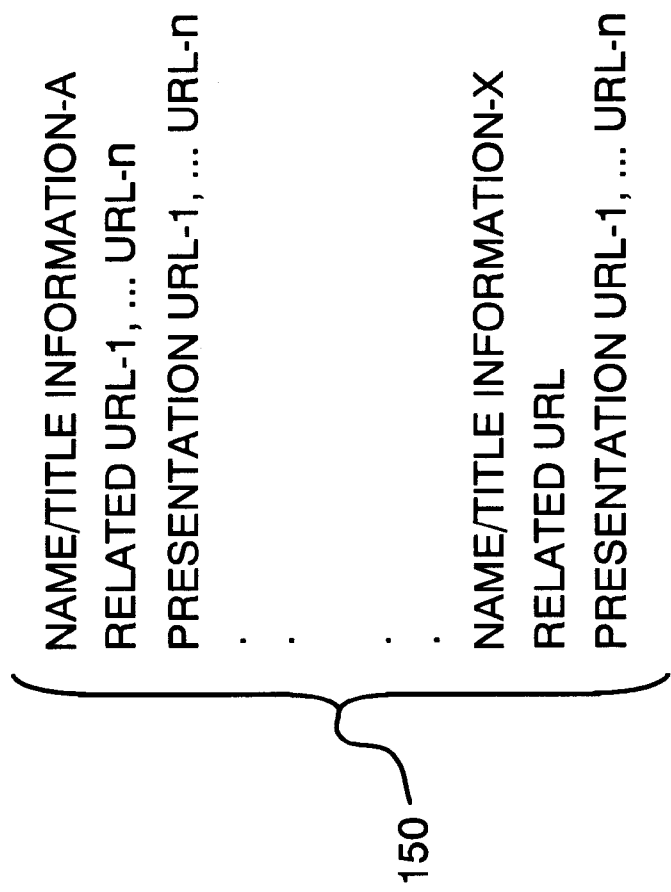
FIG. 2A is an example of one embodiment of the hierarchical data file of FIG. 2.

Referring now to FIG. 2A, shown is an example of an embodiment of a hierarchical data file 20 as included in FIG. 2. The hierarchical data file 20 includes data 150 that may be grouped together as previously set forth in conjunction with FIG. 2. In this embodiment, the hierarchical data file, for each grouping of one or more multimedia files, includes NAME/TITLE INFORMATION, one or more Related URLs, and one or more Presentation URLs. Generally, the NAME/TITLE INFORMATION is a text description of the multimedia files that are the Presentation URLs. The NAME/TITLE INFORMATION may be included, as in a menu area, as will be described in following paragraphs. The Presentation URLs are one or more multimedia files presented to the user in a presentation area, for example, of a user interface. The one or more Related URLs may annotate or further describe the one or more Presentation URLs. For example, the Presentation URLs may identify images of various types of cars by a manufacturer. One of the Related URLs may identify a website of the manufacturer. The NAME/TITLE INFORMATION may be a text description identifying the manufacturer and type of cars presented. Another one of the Presentation URLs may be a video clip of a commercial for the types of cars presented. Yet another Presentation URL may identify an audio file of a recorded jingle or song by the manufacturer as used, for example, in a commercial.

Figure 3:
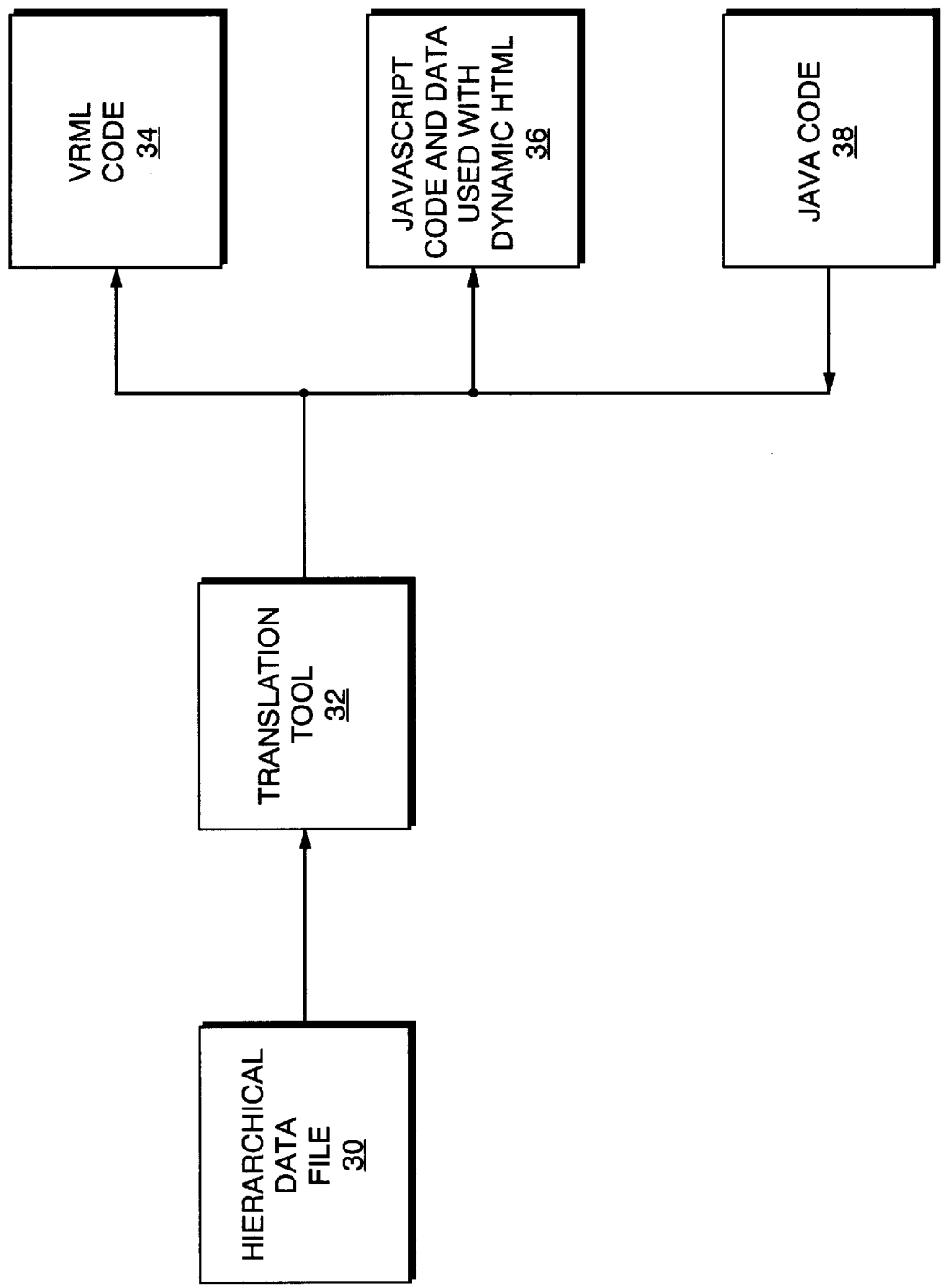
FIG. 3 is a block diagram that illustrates the flow of control in producing and using various software components included in the system of FIG. 1.

Referring now to FIG. 3, shown is an example of an embodiment of the various data files used and produced by the translation tool 32 to display the user interface and provide the software browsing tool. The hierarchical data file 30 is used as input to the translation tool 32. The translation tool 32 may produce a variety of software output files. Generally, the software output files are included in the software browsing tool used to present data. The actual output produced by the translation tool is in accordance with the actual implementation of the various components of the software browsing tool. For example, in one preferred embodiment, the translation tool produces the VRML code 34. Generally, VRML code 34 is code written in a language called Virtual Reality Modeling Language. As known to those skilled in the art, a VRML player which interprets or executes the VRML code 34 may be included in browsers such as the NETSCAPE 4.0 or the INTERNET EXPLORER 4.0 browser. The VRML player, for example, is one component required to execute the VRML code which implements one of the components of the browsing software which will be described in paragraphs that follow.

The translation tool 32 may also produce JAVA Script code and data used with, for example, dynamic HTML files 36. Generally, if an implementation or embodiment includes the use of HTML files or VRML code 34, the translation tool 32 may generate JAVA Script code and data.

The translation tool 32 may also produce JAVA Code 38. JAVA Code 38 may be used as an alternative to writing various components of the software browsing tool using the dynamic HTML files.

It should generally be noted that the software components of FIG. 2 as well as additional software components included in other embodiments may be included on one machine, or on any combination of different nodes in the system of FIG. 1. It should also be noted that various embodiments may include various restrictions in accordance with the particular versions of software, for example, used in a particular embodiment. For example, if the translation tool 32 of FIG. 3 includes JAVA code which is run using a version 1.1 JAVA applet with the default security model, it should be noted that this version of JAVA is only able to load components from the same machine that it was loaded from due to the security model of that version. Thus, various components described in FIG. 2 must reside on the same computer node of FIG. 1, such as the JAVA code used for the translation 32, the multimedia files 24 such as sound files, the user interface components, and the hierarchical data file 20.

In contrast, if this default is changed or another version of JAVA is used to execute the JAVA code included in the translation tool 32, this restriction may be removed. Thus, the various components described may be located on other nodes of the computer system 10 of FIG. 1. It should also be noted that when different software components as included in FIG. 2 are located on different nodes in the computer system 10 of FIG. 1, different transferring mechanisms may be used to transfer files. For example, in a network environment with the Internet protocol, HTTP may be used. Additionally, FTP may be used to fetch files.

Figure 4:
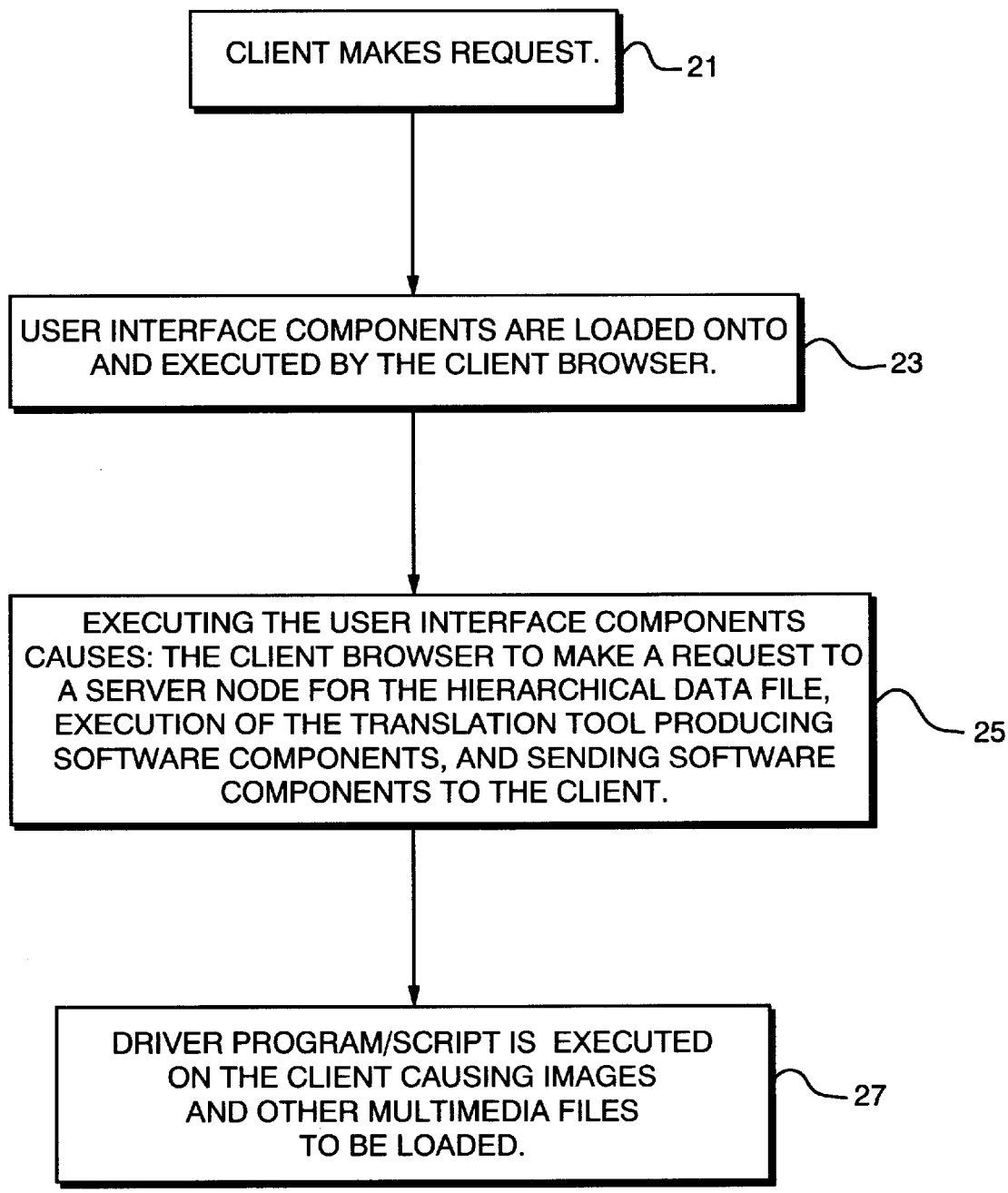
FIG. 4 is a flowchart of an example embodiment of method steps performed at run time when a client browser 16 issues a request for the software browsing tool.

Referring now to FIG. 4, shown is a flowchart of an example of an embodiment of the method steps of what happens at run time when a client browser 19 issues a request for the software browsing tool. At step 21, the client makes a request. For example, referring back to FIG. 1, the client browser 19 on node 15 may issue request using network 12 to communicate to another server node, such as node 14. At step 23, the user interface components located on a node, such as server node 14, are loaded into and executed on the client system by the client browser 19. At step 25, execution of the user interface components causes the client browser 19 to make a request to the server node 14 for the hierarchical data file. Additionally, execution of the user interface components causes the translation tool to execute producing the various software components of the software browsing tool and subsequently sending these software components produced to the client node 15. At step 27, these translated files produced by the translation tool 32 are executed by the client browser on the client system 15 causing images and other multimedia files to be loaded in accordance with a particular embodiment. It should be noted that depending upon where the various software components of FIG. 2 are located, various communication requests may need to be issued by the server node, for example, to obtain the necessary files to produce the software components. Additionally, as noted at step 27, the precise images and other multimedia files loaded are in accordance with each particular embodiment. For example, use of the VRML player causes all images to be loaded by default. Other software tools may have other defaults as well as variants which may allow image files and other multimedia data files to be loaded on demand. It should also be noted that in an embodiment where all of the files in processing occurs on the client system, no additional communication may be needed since the client and server node are the same.

Figure 5:
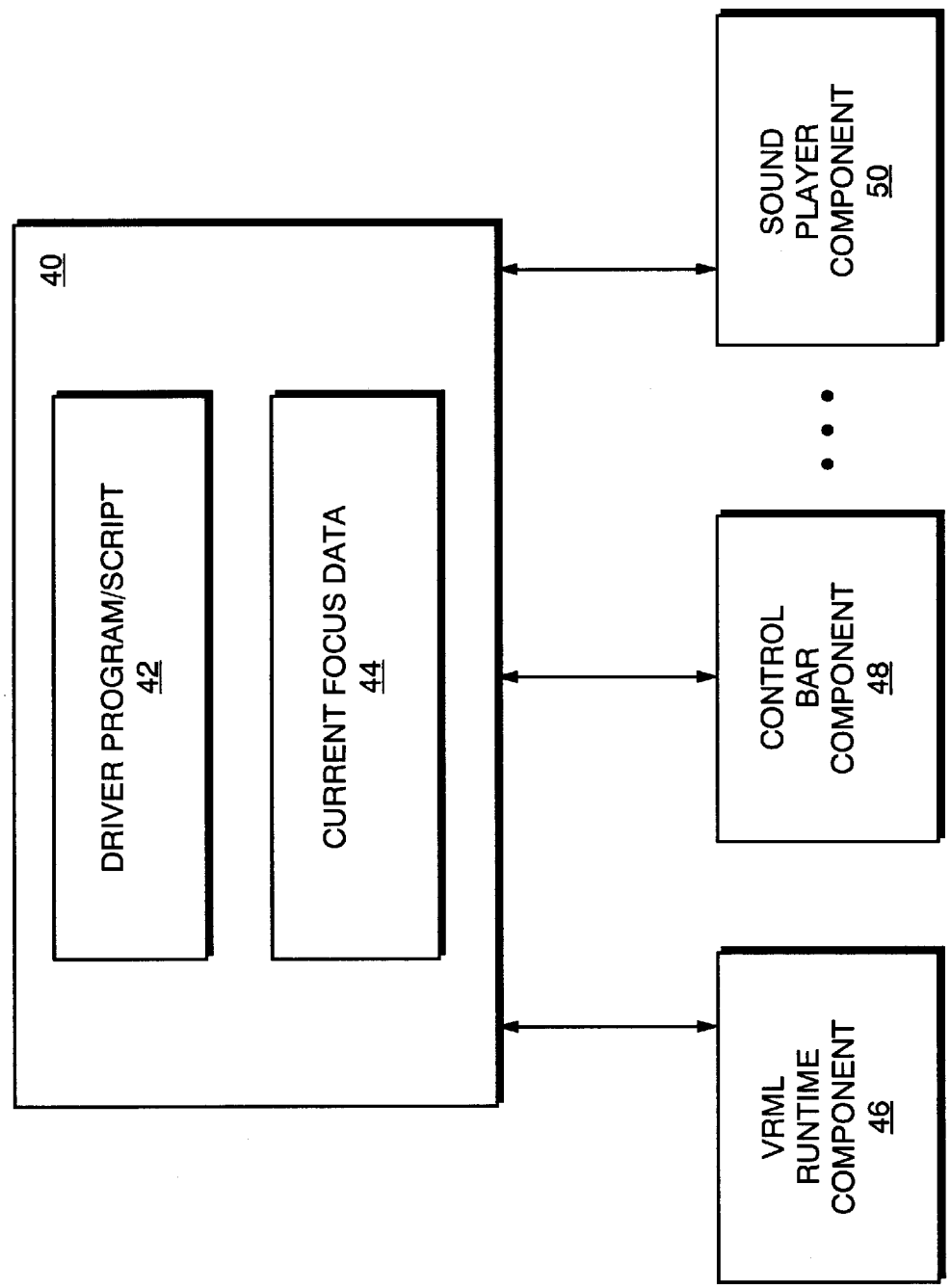
FIG. 5 is an example of an embodiment of the browsing software tool that may be included in the system of FIG. 1.

Referring now to FIG. 5, shown is a block diagram of one example of an embodiment of a software browsing tool. Generally, the software browsing tool of FIG. 5 includes driver commands and data 40 and various software components 46–50. The software components may vary with each particular embodiment of the software browsing tool and the functions provided, as well as the tools used to implement the software browsing tool. In this particular embodiment, the driver program and data 40 includes a driver program or script 42 and current focus data 44. Generally, the driver program or script 42 is a set of commands or statements which drive or control the software browsing tool. The current focus data 44 is generally a common shared data area describing the focus of the data presented to the user.

When the user is viewing data, the current focus of the data being presented may be changed as the user cycles through and views the various multimedia data items. As this happens, the focus changes as the user examines different images or other multimedia data. When there is a change in the focus, the focus data 44 is updated by a signaling handler as specified in the driver program or script 42. A mechanism exists in the driver program or script providing a control for updating the focus data 44 and additionally signaling all of the components as to the change in the current focus. The various components then update their local copy of the focus data and redisplay their various portions of the user interface. In this particular embodiment, for example, the driver/program script 42 is a JAVA script and the current focus data is represented as a JAVA script object. All of the URLs which are presented to the user representing multimedia data are represented as JAVA script objects with the grouping structure or hierarchy described in the hierarchical data file 20. The driver program or script 42 may be one of the JAVA script code and data components produced by the process of FIG. 3 by the translation tool 32. The VRML runtime component 46 may include VRML code 34 as produced by the translation tool 32 of FIG. 3.

It should be noted that other embodiments may implement the current focus data as other language entities or data objects in accordance with the implementation language chosen.

The various other components, such as the control bar component 48 and the sound player component 50, may be implemented using a variety of different coding languages. In one embodiment, JAVA code, as may be produced by the translation tool 32, may be the language of implementation for these components. In another embodiment, one or more of these components 48–50 may be implemented using JAVA script code and data with dynamic HTML. The precise control mechanism used by the driver program/script 42 may also vary with implementation and embodiment. In this particular embodiment, the JAVA scripting language provides a control mechanism by which the various components are updated when the user focus changes. It should be noted that each of the components 46–50 of FIG. 5 for the browsing software tool are generally independent, pluggable pieces that may be removed or added independent of the other components. Generally, as will be described in paragraphs that follow, each component maps to a particular component of the user interface displayed and is responsible, for example, for updating and performing other functions within that particular portion of the user interface.

It should also be noted that the hierarchical data file 30 of FIG. 3 may be produced manually or in an automated fashion, such as by a software tool that may be implemented using one of many different languages known to those skilled in the art. For example, various directory structures and subdirectories may be used to group files in accordance with the hierarchy description to be included in the hierarchical data file. A software program written in a commercially written programming language, for example, may use systems functions to inquire as to the contents of the various directories and subdirectories and accordingly, produce a hierarchical data file in accordance with the directory and subdirectory structure. Other embodiments may include different ways of producing the hierarchical data file in an automated fashion in accordance with a particular system of FIG. 1.

It should also be noted that the various images or other multimedia data files which will be used in presenting information to the user by the software browsing tool of FIG. 5, may be loaded prior to runtime, such as by caching data in memory on the server or other node as part of a preprocessing step.

Figure 6:
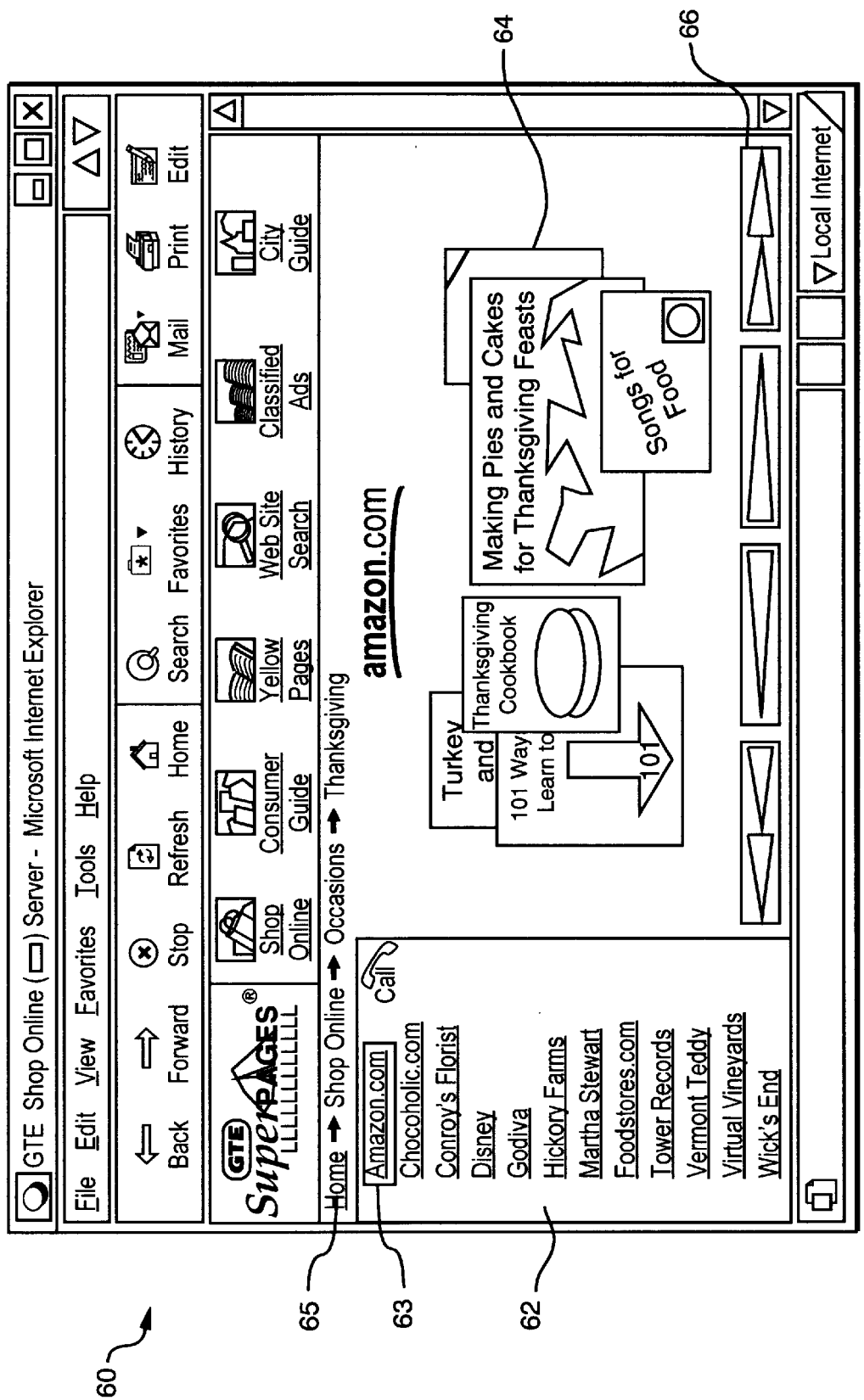
FIG. 6 is an example of a user interface display for a generated browser software tool.

Referring now to FIG. 6, shown in an example of an embodiment of a user interface as displayed by the software browsing tool. Generally, FIG. 6 shows an example of the browsing tool used in the application of the domain of Internet shopping. The user interface 60 includes a menu or outline portion 62, a presentation area 64, and user control buttons 66. Generally, the outline or menu portion 62 displays various topics or text descriptions which accompany the items, images, or other multimedia data being presented in the presentation area 64. The user may control the speed or direction in which the images or other multmedia data which correspond to various items listed in the menu area 62 are displayed to the user. For example, as will be described in paragraphs that follow, control display 66 includes buttons which provide for backward and forward review of the multimedia data presented in the presentation area 64. Accordingly, the active or highlighted portion, for example, of the outline or menu area 62 is synchronized with the presentation in accordance with the user positioning of the controls. If the user, for example, wants to preview multimedia data items that were already presented, the rewind button from the user control area 66 would be used also causing the menu portion 62 to have its active item updated in accordance with the multimedia data items presented in the presentation area 64.

In the menu or outline area 62, the active or current focus is denoted by highlighting, for example, a particular item in the menu portion 62. In one embodiment, as shown in FIG. 6, the current outline or menu item has an arrow 63 next to it in the upper left hand corner. As the user is presented with multimedia data in different areas in accordance with different portions of the outline, the arrow in the left hand corner advances accordingly in the menu portion 62. Other techniques may be used to indicate an active or current focus on the outline area 62. Other ways of indicating an active or current menu item in the area 62 include highlighting a particular area on the menu, or showing a color contrast from the rest of the menu items.

With regard to the user interface displayed in FIG. 6, the content of the multimedia data presented has to do with promotional advertisements generally associated with online or virtual storage such as those available through the Internet that had been categorized by product type as well as occasion. For example, suppose the user has selected the category "Thanksgiving" through the button bar area 65. In this particular embodiment, the system generates the browser tool for the set of stores that have a promotional offering in the category selected by the option 65. As the user places the cursor over the arrow controls at the bottom of the main presentation area 66, images and/or other multimedia data representing the promotional content are presented one after the other in a semi-random spatial layout in the presentation area 64. Transitions between stores clear the presentation area. Additionally, the store whose promotional items are currently being presented in the presentation area 64 are indicated in the listing at the left by the appearance of a red arrow, as indicated in the outline or menu portion 62.

The user may control the speed of the presentation of the images and other multimedia data by choosing among the arrow controls 66. In this particular embodiment, the greater distance the cursor is placed from the center of the control area, the greater the speed in a particular direction. For example, two sets of arrows in the control area 66 go to the right indicating forwarding of the multimedia data presentation, and two sets of display arrows go to the left indicating reversing the multimedia data presentation. The farther to the left the cursor is placed over the arrows, the faster in reverse the multimedia data in the presentation area is displayed. This also parallels the fast forwarding controls as indicated by the arrows to the right in the control area 66.

Figure 7:
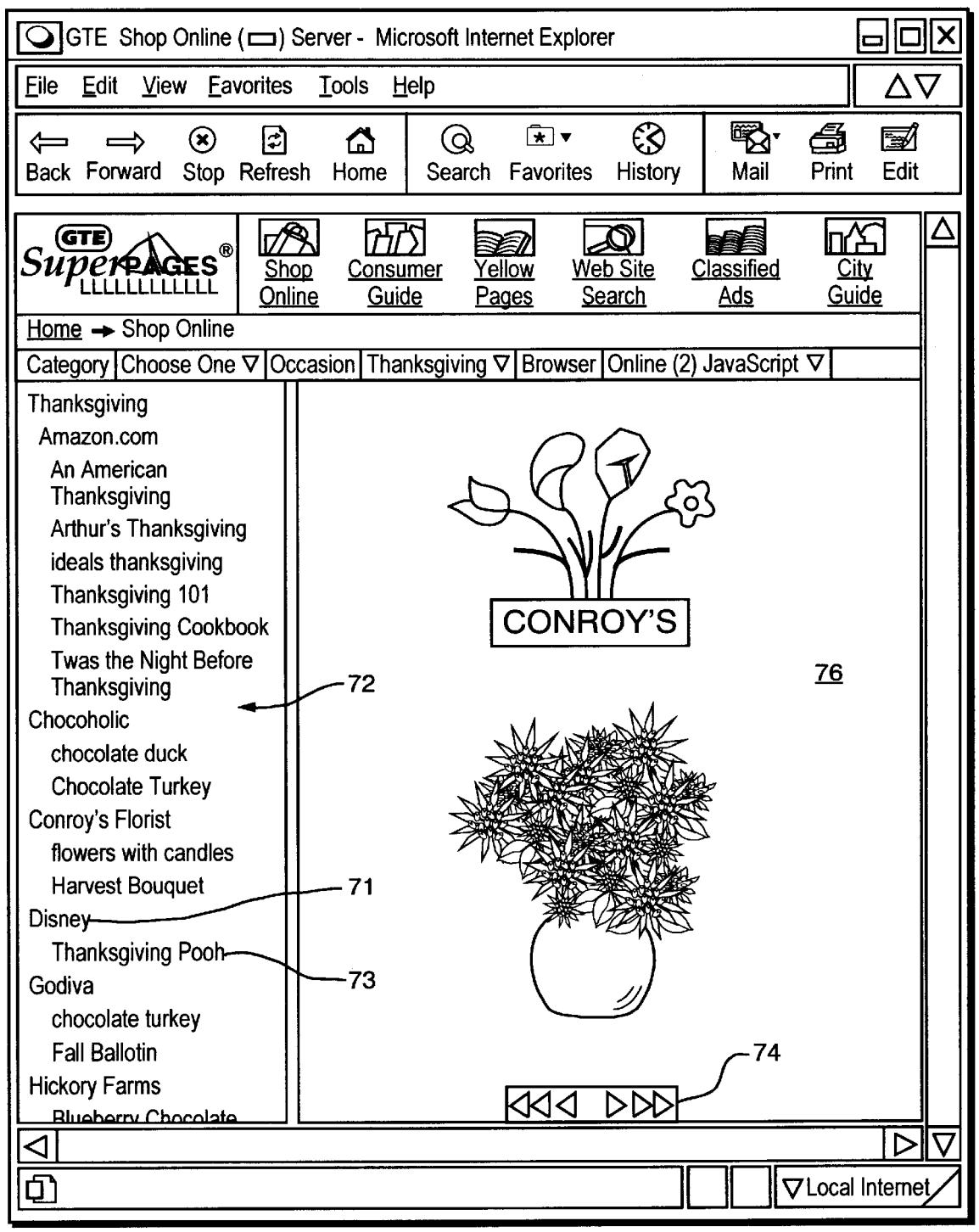
FIG. 7 is an example of an embodiment of a user interface displayed with a detailed outline.

It should generally be noted that the multimedia data presented in the presentation area 64 of FIG. 6 and in other user interfaces which will be described in paragraphs that follow may be presented in a variety of different presentation arrangements. In this particular embodiment, the multimedia data is presented in a stacking arrangement, as will be described in more detail below. Referring now to FIG. 7, shown is a user interface of the browser software tool with a variant including more detail in the text outline portion 72. FIG. 7 includes a presentation area 76, user control 74, and an outline or menu portion 72. These areas are similar to those as previously described in conjunction with FIG. 6 user interface 60. This variant of the browser is also for the shopping domain in which the listing of the stores in the left hand portion includes store titles as well as the names of the products being promoted. In. FIG. 6, the user interface 60 included only stores in the outline or menu area. In this embodiment of the user interface of FIG. 7, the outline or menu area 72 includes a store name, such as Disney™71, as well as the product being promoted such as Thanksgiving Pooh™73. In this variant, products are shown one at a time in order to make synchronization with the presentaton area 76 and the menu item 72 straight forward with the detailed hierarchical text outline listing. Thus, at execution time, the browser variant 70 of FIG. 7 may present one image or other multimedia data element at a time. This is in contrast to the user interface 60 of FIG. 6, in which multiple multimedia data objects or elements are presented which may overlap or be superimposed upon one another.

It should generally be noted that the multimedia data presented in the presentation areas 76, 64, and other user interfaces which will be described in paragraphs that follow, may be "dragged and dropped" for performing other user functions. For example, the user may drag and drop an item from the presentation area to place in a virtual shopping basket for items which the user may wish to purchase at the end of their viewing or browsing session. Additionally, by selecting one of the items in the presentation area, such as by a double click with the left hand mouse button, a user may be connected, as by a hyper link, to a different Internet website. Selection may also have other meanings depending on the application of the viewing or browsing session. For example, if the user is selecting or viewing movies or TV channels, selecting a particular item in the presentation area may mean to select a movie and view a portion of a movie trailer, for example. If it were a TV channel selection, an image selection from the television show on each particular channel may be presented in the presentation area 76. The user may select a TV channel and the particular TV program for current viewing.

Additionally, when multimedia data is presented to a user, various multimedia files may also be executed, for example, while an image is being viewed. For example, a sound file in addition to an image file may be played to a user when viewing images, for example, of a particular movie.

It should also be noted that in the menu areas 72 and 62 a user may jump to a particular section in the sequence by selecting an item from the menu. For example, if the user's focus or current point is at the top item as in FIG. 6, a user may advance to the end of the menu item and accordingly cause presentation of the multimedia data associated with that item by selecting the last item from the menu area. This is a shortcut method by which a user may quickly advance to a particular area in the menu to look at and view the images and other multimedia data associated with that particular item in the menu selection.

The user interface of FIG. 6 may generally be described as a slide show presentation by which the user may begin a multimedia presentation associated with the first item in the menu area 62. An embodiment of this may automatically advance at a set speed from the beginning to the end of the menu and accordingly present multimedia data in the presentation area 64 at a given pace. The user may control the presentation of the multimedia data by using the control area 66. This is similar to the way in which a movie, for example, may be viewed in which the play button causes the images of the movie to be presented at a particular speed. However, a user may rewind or fast forward to a particular section using the controls. This is a method of auto-scrolling through multimedia data associated with the menu selection area 62.

The multimedia presentation of FIG. 7 generally includes a hierarchical level of menus displayed in the area 72. In this particular embodiment, there is a nesting of several levels of menu items. Generally, the outermost level menu is denoted as level 1 and the level numbers increase sequentially to 3 and the like as the nesting gets deeper. In this particular display 72, while an innermost level is displayed, the outermost levels also stay constant on the menu. For example, if the nesting level was level 3, and the menu items spanned more than one screenful, while the additional items from the level 3 menu were displayed, the level 1 and level 2 items would appear constant on the screen for the user so that the user is provided with information indicating where the current focus is for the menu items being displayed. In other words, the user is provided with context feedback information describing where at any particular time multimedia data in the presentation area is located relative to the menu items 72. The presentation area 76 of FIG. 7 may present images and other multimedia data using a variety of techniques. Multimedia data may be presented in a temporal fashion, one multimedia data item at a time with subsequent data items replacing or overlaying previous multimedia data items, in synchronization with a sound file and the more detailed menu 72, for example. Multimedia data may also be presented in a rolling or scrolling fashion in an upward or downward direction. This technique is further described below.

Figure 8:
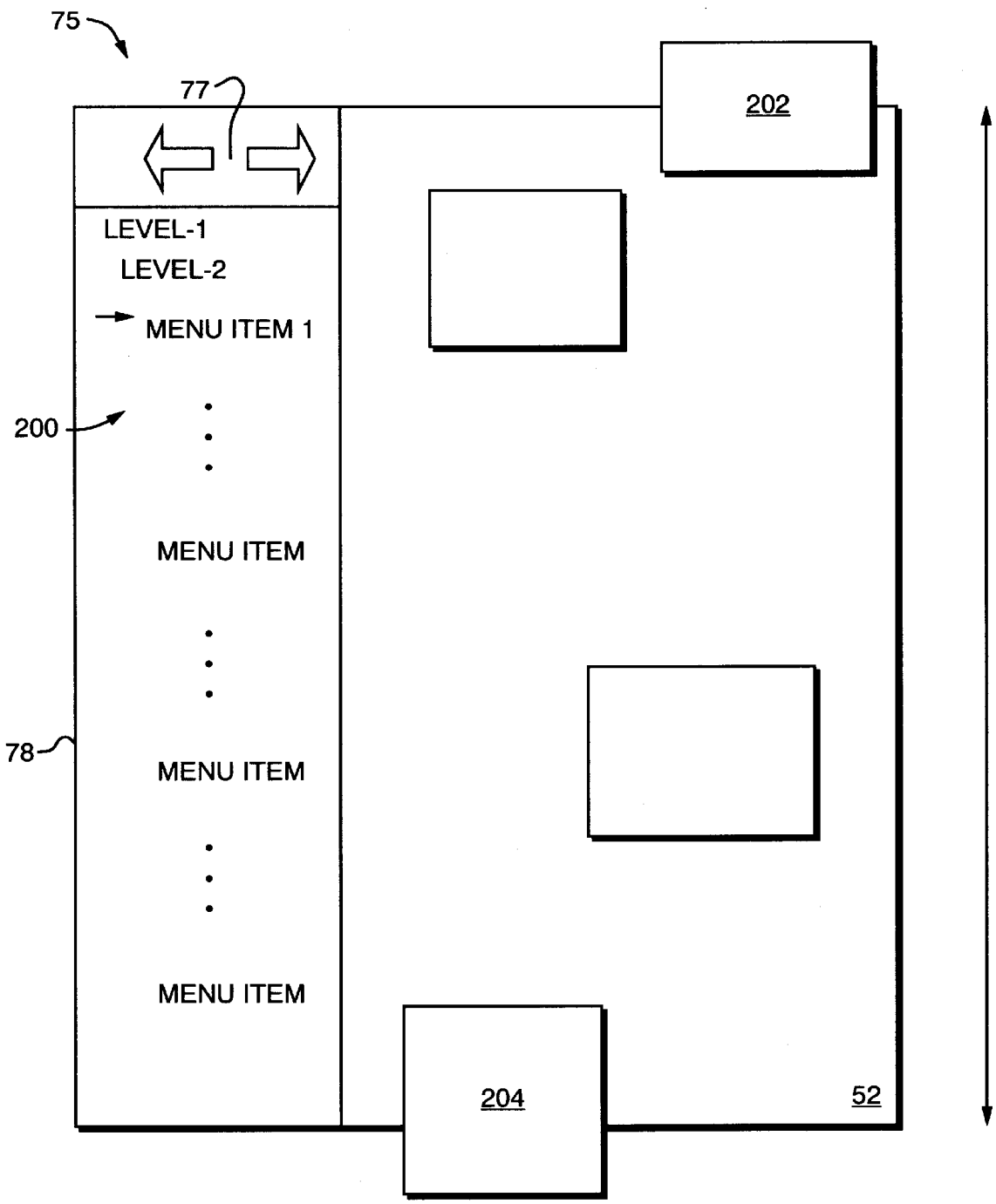
FIG. 8 is an example of an embodiment of a user interface of the software browsing tool using an auto-scrolling method for presenting multimedia data.

Referring now to FIG. 8, shown is an example of a user interface of the software browsing tool which presents the auto-scrolling method for presenting multimedia data. The user interface 52 includes user control 77, a presentation area 75, with multimedia data presented, such as multimedia data items 202 and 204, and a menu or outline area 78. In this variant of the user interface of the browsing tool, the user scrolls through a series of multimedia data items which are predetermined in a format layout out such as in a top to bottom fashion. The motion of controlling or scrolling through the multimedia data using control 77 scrolls along in the x-y plane as indicated by the arrow on the right hand side for forward and reverse direction of presenting the multimedia data items. A portion of multimedia data items 202 and 204 are shown as extending beyond the user interface screen 75 for the purposes of demonstration only. Generally, if the user were to, for example, rewind or reverse through the user controls 77, a portion of the multimedia data 202 would be presented which is off the screen for the current point of view. Similarly, if the user were to slightly fast forward using the control 77, a portion of the multimedia data 204 which is shown as off the screen currently would be included on the presentation area 52 displacing a portion of the other multimedia data items, such as 202. Thus, the user has a point of view or focus which is the size of the presentation area 52 which scrolls downward through a prearranged presentation of multimedia data in a layout fashion. By using the user controls 77, a user may view portions of the multimedia data in the presentation area 52. As described before in conjunction with other figures, the user may advance to a different position on the scroll by selecting a particular menu item. This is in addition to using the user control 77 to rewind and fast forward to the multimedia data contained in the scroll.

It should be noted that "Level-1" and "Level-2" of menu area 78 may be "active" in that they may be selected and used to modify the current focus or point of view of the user with regard to the data presented in the presentation area 52.

Figure 9:
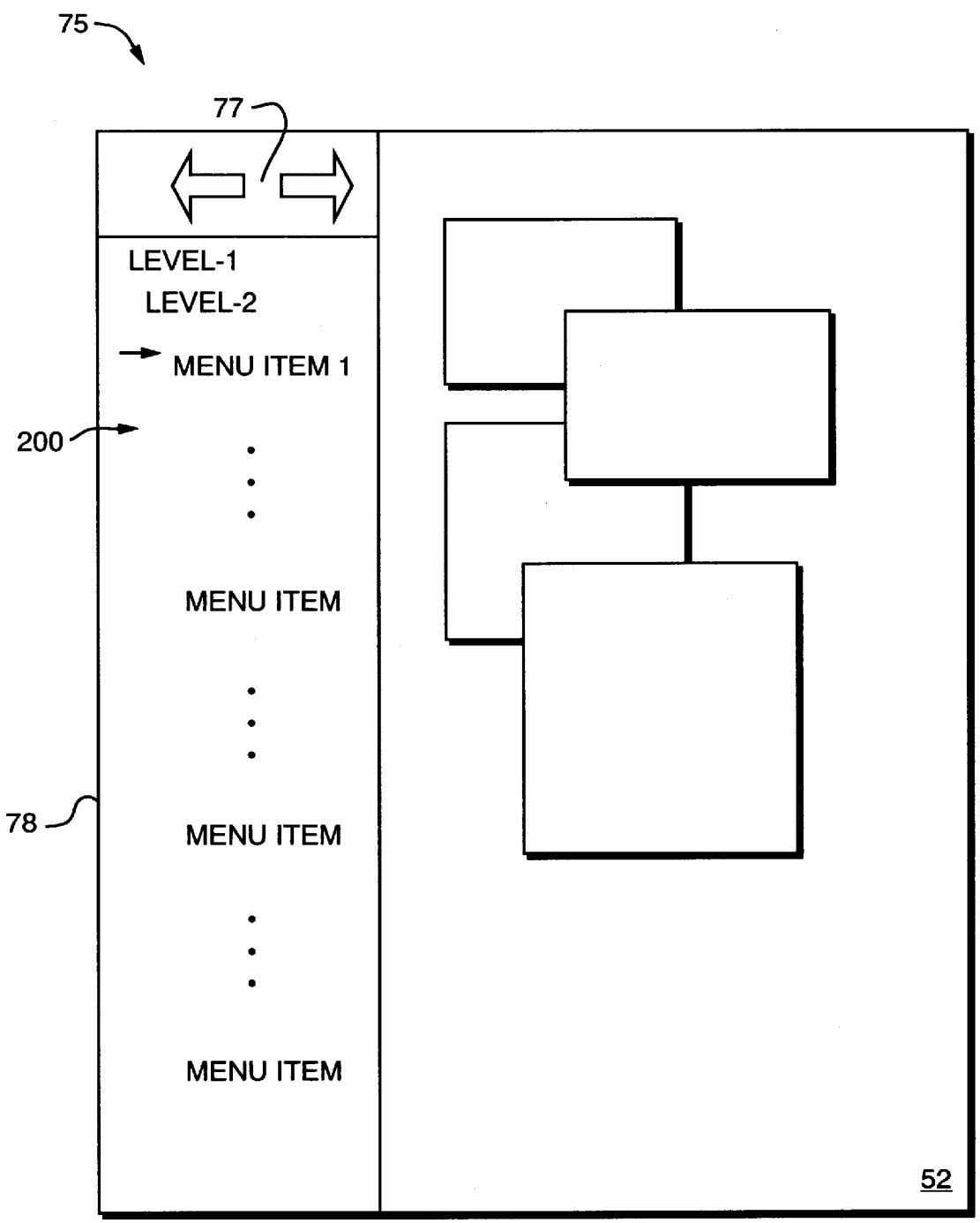
FIG. 9 is an example of an embodiment of a user interface of a software browsing tool that presents multimedia data as a stacked slide show.

Referring now to FIG. 9, shown is an example of an embodiment of the user interface for the browser tool which presents multimedia data in the presentation area 52 in a stacked slide show fashion. Generally, note that multimedia data items which may be presented in the presentation area 52 are slightly stacked upon one another for viewing at a predetermined time interval. The user may control with the user controls 77 how fast or slow the multimedia data items are stacked upon one another in the presentation area 52. It should generally be noted that the multimedia data may also appear in an unstacked fashion in the presentation area 52 such that the multimedia data items do not overlap each other. This is yet another variant of the browser presentation area for presenting multimedia data in accordance with a menu item 78 with user control over the presentation of the multimedia data 77.

Recall that the scrolling effect had the images and/or other multimedia data presented in a predetermined top to bottom fashion with the user interface presentation area acting as a window clipping or viewing a portion of this predetermined area. The stacked slide show is similar to the appearance of having a deck of cards where each multimedia data item corresponds to a card in the deck in which the cards are placed one on top of each other in the presentation area. Fast forwarding or rewinding through a stack slide show of multimedia data results in cards being removed or placed on top of the deck. Similarly, it would result in multimedia data items being stacked or layed on top of one another or removed from the stack.

Figure 10:
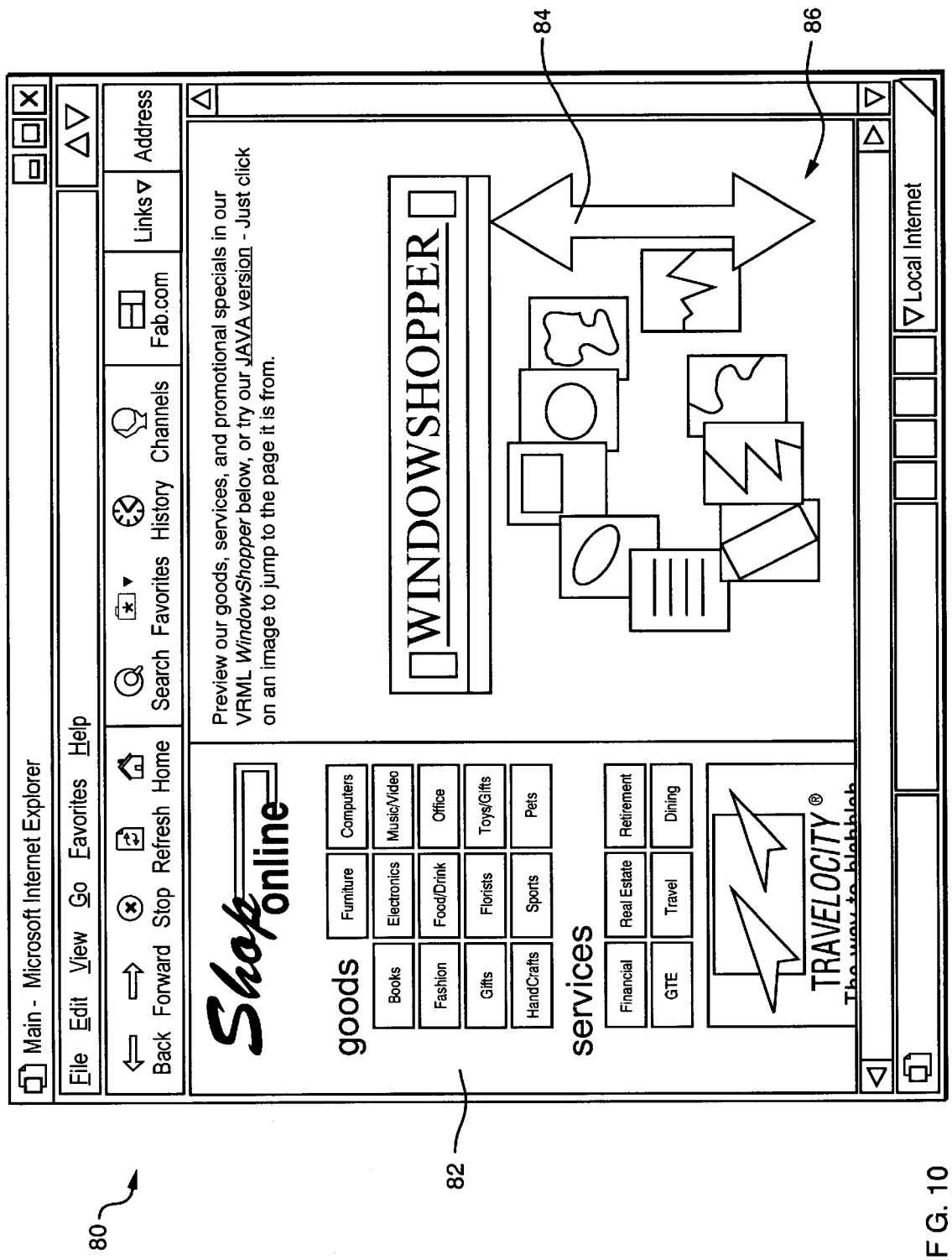
FIG. 10 is an example of an embodiment of a user interface displayed with the browser tool using the flyby effect.

Referring now to FIG. 10, shown is an example of a user interface of the browser variant in which the presentation area or the display area incorporates a three-dimensional fly through or flyby effect as opposed to the previously described scrolling effect in various slide show effects. The user may control the presentation in the presentation area 86 using the control arrows 84. The user may select various categories of multimedia data items to be presented using the buttons indicated in the selection area 82 of the user interface display 80. Additionally, as previously described in conjunction with other presentation areas, a user may select a particular multimedia data item from the presentation area 86 which causes the user to jump to the page where the multimedia data item is from. In other words, selecting an item from the presentation area such as with the mouse, a user may use the hyperlink Internet connection by which they are connected to the page on the Internet upon which an image or other multimedia data item may be located. Generally, the position of the user's mouse cursor, for example on the arrow 84, determines the speed of the presentation which essentially has an infinite range from 0 to the maximum that the display device is capable of achieving. Audio feedback of the current speed may also be included. Generally, the three dimensional flyby effect, which will be described in more detail in paragraphs that follow, involve the user being presented with images or other multimedia data as if they are flying by the user. Generally, multimedia data may include movie or video clips, sound files, or 3-D models, and the like. Each of the multimedia data presented is subject to a 3-D flyby effect with regard to the type of multimedia data. For example, if a multimedia data file presented is a sound file subject to the 3-D flyby effect, the intensity of the sound is varied in accordance with proximity to the user.

Figure 11:
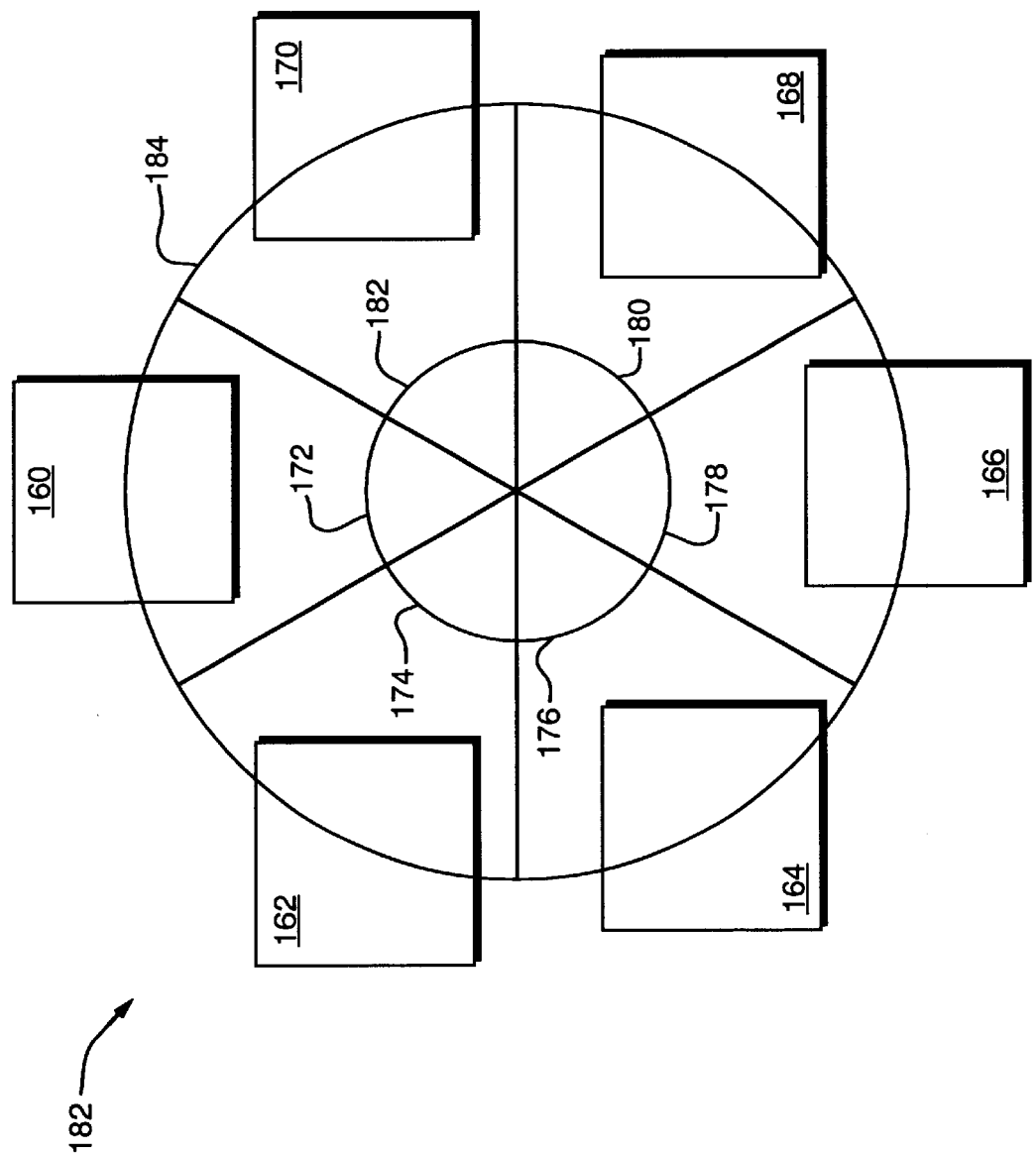
FIG. 11 is an example of an embodiment of a layout technique that may be used with the flyby effect in presenting a group of multimedia data.

Referring now to FIG. 11, shown is an example of an embodiment of a frontal point of view of multimedia data presented using the flyby effect of FIG. 10. The presentation arrangement 182 is one technique that may be used to present images in the presentation area 86 of FIG. 10. Data items 160–170 are presented in as a group of data. Data items are presented one at a time in a counter-clockwise direction in a circular arrangement. The center of each data item 160–170 is placed on the circumference of the circle 184 as it appears in the presentation area 86. It should be noted that circle 184 does not actually appear in the presentation area but is displayed in FIG. 11 to indicate placement of the data items 160–170. Each of the data items 160–170 are placed equidistant apart such that each of the angles 172–182 are the same. This technique may be generalized for any number of data items such that they are placed equidistant apart in a circular arrangement in a counter-clockwise order.

Subsequent groups of data items are presented in an arrangement with a random angular shift in the counter-clockwise direction. In other words, in subsequent data item groups presented, the position of the first data item 160 is shifted by a random amount in the counterclockwise direction. Similarly, the placement of subsequently presented data items in the same group are positioned with the same angular shift.

Figure 12A:
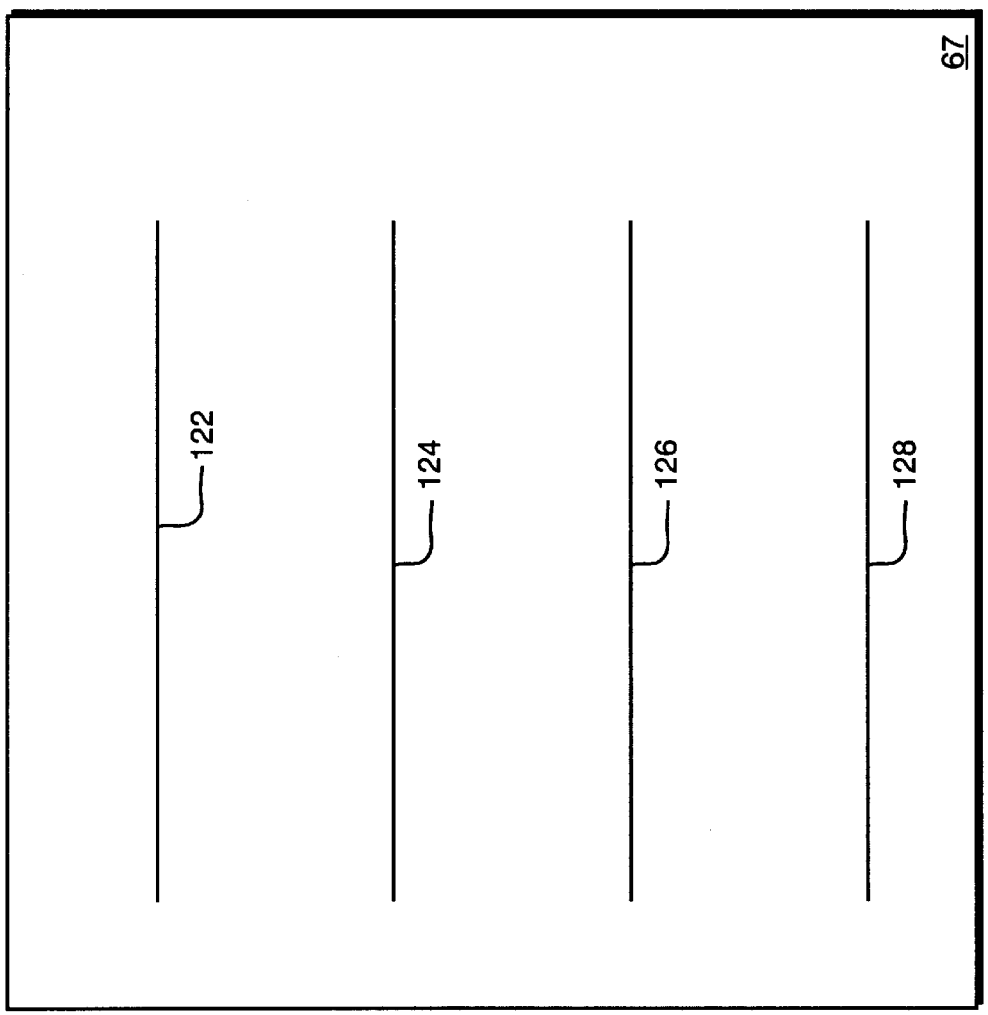
FIG. 12A is an example of an embodiment of a top-down view of multimedia data presented using the flyby effect and layout technique of FIG. 11.
Figure 12A:
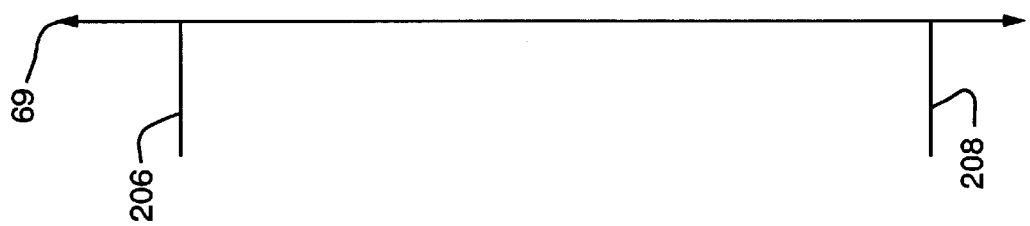

Referring now to FIG. 12A, shown is a view of the multimedia data of FIG. 11 looking down with the 3D flyby effect being used to present the multimedia data to the user. Each of the data item groups 122–128 represents a group of data items presented similar to those in the group 182 of FIG. 11. In other words, each of the groups 122–128 is a "slice" or page of data items presented using the circular layout technique described in conjunction with FIG. 11.

Generally, the procedure for laying out multimedia data in a 3D flyby effect includes defining a certain area and placing the multimedia data for presentation within that defined area. A user's view or perspective at a particular point in time, such as a snapshot of the multimedia data in FIG. 11 is depicted as having the user move along the arrow indicated in the left-hand side of FIG. 12A on the y axis 69. Thus, at any particular point in time, a user's point of view or snapshot of the multimedia data, such as those presented in FIG. 10 in the presentation area 86 represent a viewpoint of the multimedia taken from user perspective. For example, as the user fast forwards or proceeds through the presenting of the multimedia data items moving towards the screen or towards the data item 122, the data items 124, 126, and 128 will appear to fly past the user and the data item 122 will appear to come closer to the user. Similarly, when rewinding or moving out from the direction from data item 122 towards 128, the data items will appear to fly by the user in reverse order with a perspective or focal point into the screen.

Generally, the data items presented have a perspective such that the farther the multimedia data items are in the fast forward direction, the farther away they appear in the presentation to the user and appear to go to a focal point into the screen. Similarly, as multimedia data items are viewed, they pass by the user on the presentation area 67 giving the user the impression that the multimedia data items are moving past where the user is out of the visual path. Thus, when a user rewinds the multimedia data items in the presentation area, the multimedia data items are presented or refreshed in reverse order. This gives the appearance as if the data items are coming from behind the user to the current focus on the screen and, as the rewinding continues, the multimedia data items move into the screen such as at a distant point.

The top or downward view of the user perspective in FIG. 12A generally includes a defined area 67 where groups of multimedia data items 122–128 may be positioned. The user's perspective or focus moves along the y axis, as indicated by the arrow 69. At any point in time, the user's view point may be associated with a point along the y axis 69. The multimedia data items are presented to the user from the user's perspective at a particular point along the y axis denoted by the arrow 69 as if the user were sitting in front of the defined area 67 with all of the multimedia data items coming towards the user or away from the user, as controlled by the control area 66 of FIG. 6. For example, if the user were sitting in front of the screen and the controls indicated the position with regard to the user's perspective with a focus at 208, the multimedia data item associated with 128 appears closest to the user with groups of multimedia data items 122–126 giving the perspective of being farther away. In contrast, if the controls indicate that the user perspective is at position 206, no multimedia data items are presented on the screen and this may give the user the perspective that all of the multimedia data items have already been viewed.

Figure 12B:
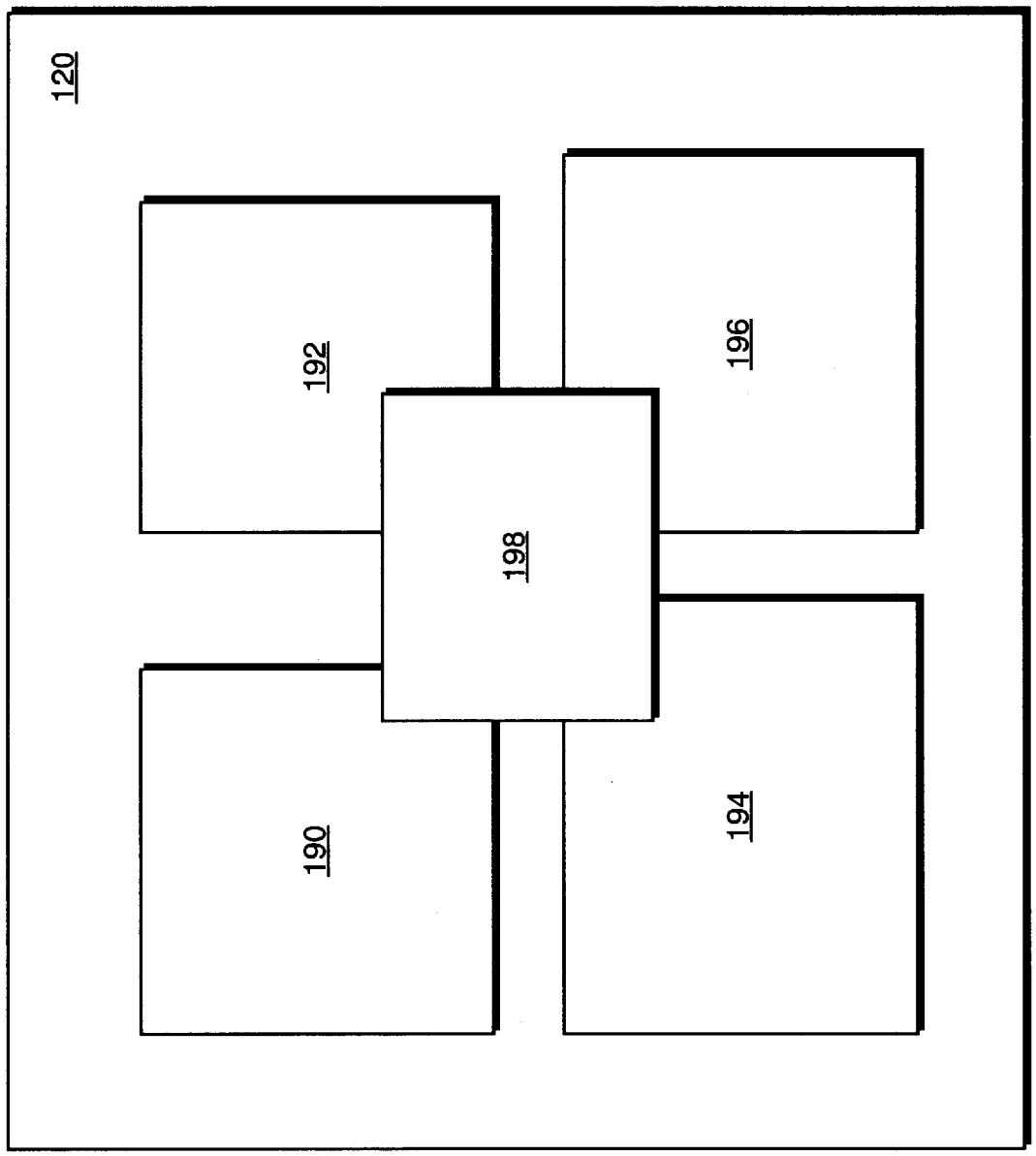
FIG. 12B is an example of an embodiment of a layout technique that may be used in a multimedia data presentation.

Referring now to FIG. 12B, shown is an example of an embodiment of another technique for presenting data in a presentation area 120. Generally, the presentation area 120 may be included in one of the user interface displays such as 80. What will be described in conjunction with the next two figures is a technique for presenting multimedia data in a group layout in which there is a parent and child relationship between various multimedia data items to be presented on the presentation area 120.

In this particular embodiment, there is a group of data items 190–198, with the parent 198 being located in the center of the presentation area and the children 190–196 being located surrounding the parent. In this particular embodiment of a group, the parent is presented in the center of the group with children being placed in four quadrants beginning with the upper left relative to the center of the group which includes the parent node. It should generally be noted that if there were only three children for a particular group, the children would be placed in order beginning with the upper left quadrant proceeding in a clockwise fashion until all the child data items have been presented. Similarly, it should be noted that if there are more than four data items, the fifth succeeding data item would overlap the first data item in the upper left quadrant and accordingly be placed in that quadrant with succeeding data items numbered 6, 7, 8, and so on overlapping successive quadrants. Using a slight variant of this technique, rather than successively present multimedia data in each of the four quadrants, one may view the upper left quadrant as a starting point and an end point and present multimedia data items in a clockwise circular fashion one on top of another in a slightly stacked fashion beginning and ending with the upper left quadrant and accordingly space the multimedia data in accordance with the number to be presented in a particular group.

The snapshot of multimedia data items presented in FIG. 12B represents the multimedia data items which may appear to a user, for example, at a particular point in time.

Figure 13:
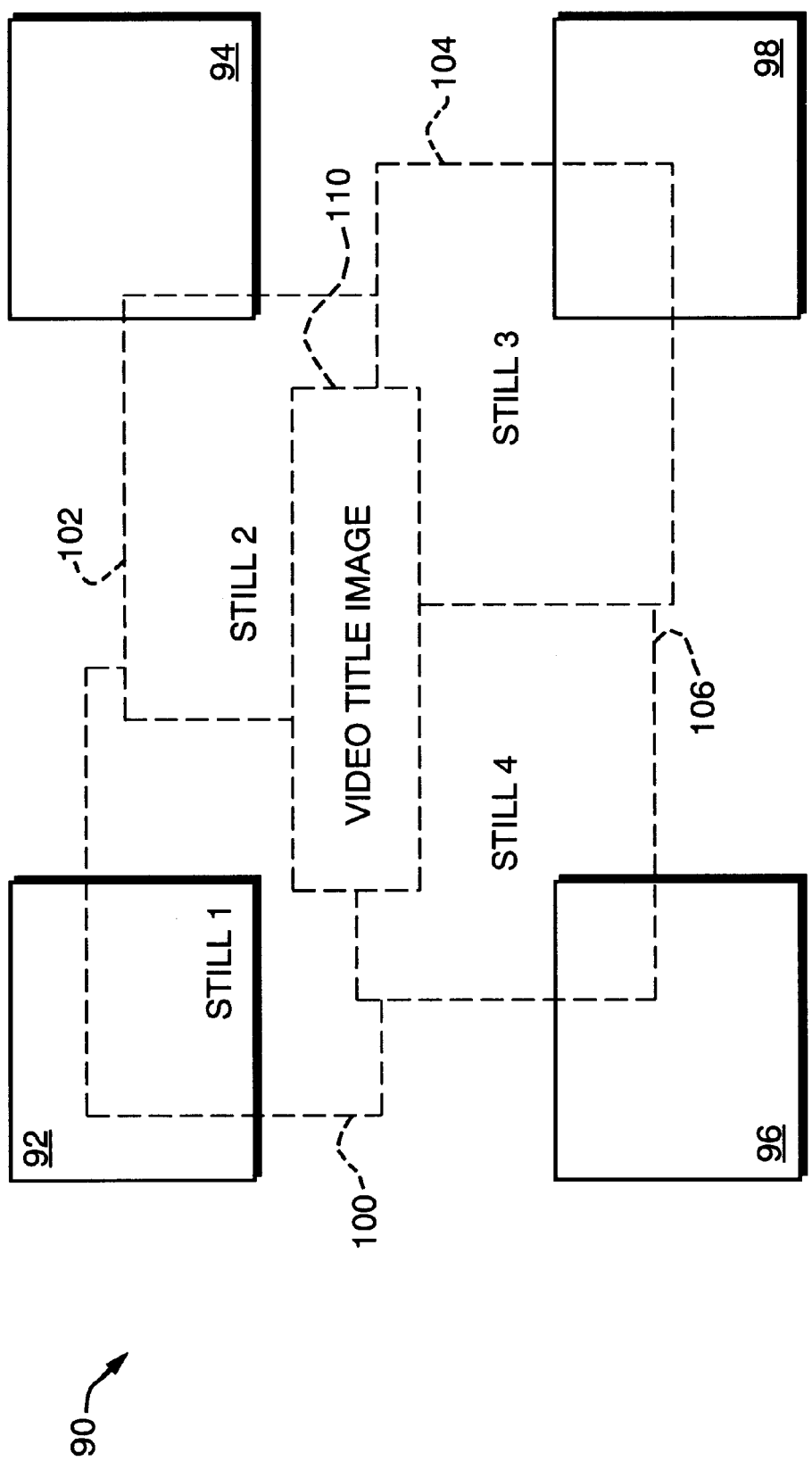
FIG. 13 is an example of an embodiment of a schematic for a technique for presenting multimedia data as in FIG. 12B.

Referring now to FIG. 13, shown is an example of an embodiment of a layout technique for presenting the data items of FIG. 12B. As previously described, the technique with regard to presenting a particular group of multimedia data items is a layout between a parent data item and its immediate children. For example, in presenting a video and various snapshots from that video in the presentation area 90, the video title may appear in the center 110 as the parent node. The children may be the still images or snapshots of various pictures from the movie appearing as still images 100, 102, 104, and 106 in FIG. 13. The title of the group is placed in the center of the canvas or presentation area. The technique then rotates placement of succeeding images such as 100, 102, 104, and 106, in a clockwise fashion around four quadrants 92, 94, 96, and 98 beginning with the upper left quadrant 92. The title multimedia data or parent 110 always remains on top of the still images and/or other multimedia data or children while succeeding multimedia data items may overlap each other. Each of the quadrants itself is divided further into quadrants, and a corner of each multimedia data item is randomly placed within the outermost quadrant. That is, each of the multimedia data items shown in FIG. 13 has a corner placed somewhere in one of the rectangles 92, 94, 96 or 98. Such a technique for presenting multimedia data items provides a predictable temporal sequence by providing a regular rotation that is further reinforced through a layering effect in that more recent data items are always in a layer above the less recent ones. Also included is a fading effect through control such that only the most recent data item is fully opaque with others successively less so. The randomness and the overlapping allows the use of images and other multimedia data items of various sizes and aspect ratios. Referring back to FIG. 11, the technique described in conjunction with FIG. 13 is applied to the multimedia data items produced and presented in the presentation area 120. In effect, the multimedia data items presented in FIG. 11 are those at different points and times for different groups as they fly by the user.

The examples just described present user interfaces with images and/or other multimedia data items that particularly fall into two general domains which are Internet shopping, and video selection or program guides. However, the techniques and the user interfaces are widely applicable to any variety of data being presented associated with any particular domain or application in which the content may be structured hierarchically. Individual objects or multimedia data in the content may be rendered in a form of image based summary information. The techniques described are capable of using a number of different spatial layout techniques and transitions for rendering individual multimedia data items to be presented in a particular presentation area.

In addition to the actual presentation of the multimedia data items to the user in one of a variety of forms and techniques in the presentation area, the actual user controls as included in the control areas of the previously described user interfaces are also important.

One advantage of the foregoing technique is that each of the multimedia data items may be presented for a longer time period than using the prior art slide show technique improving recall and depth of processing of a particular set of objects when presented to a user. In other words, the combined temporal and spatial presentation of the foregoing technique provides coherence in associating content from the same grouping of objects with each other.

Referring now to FIG. 14, shown is an example of a variety of user controls as included in the previously described user interfaces. The controls allow the user to make adjustments to the speed as well as the direction of the temporal presentation. The user controls 130 may be used to control both direction and speed in which the position of the mouse cursor, for example, within the arrow is an indicator of the speed. As the mouse arrow approaches the arrow tip, the speed increases up to the maximum that the display device may support. Visual feedback is indicated to the user by the level of color saturation within the arrow. In other words, the faster the images/and or other multimedia data items are presented, the closer to the arrow tip the mouse cursor is, and the darker or deeper the color of the display arrow. Additionally, instant on/off is achieved when the mouse is over the user control 130 or on the user control 130. In other words, the user does not need to select by depressing or clicking the mouse button in order to turn on or change the speed, or its direction. Simply by placing the mouse cursor over a particular portion of the arrow causes the speed to be altered or the direction to be changed. Moving the cursor off of the arrow causes the speed to return to the predetermined rate, or stops the presentation. Elements 136 and 138 are variants of the controls of the arrow depicted in 130. The slidebar 134 may be used also to slide to various points within the presentation of the multimedia data items in a continuous sequence. It should be noted that the function provided by the slidebar 134 is similar to the menu selection location as provided, for example, by the menu presented in the menu area 72 of FIG. 7.

Other embodiments of element 136 may have any number of additional arrow icon blocks in the forward and reverse direction offering a finer granularity of control. For example, the arrangement in 136 has one block of arrows for the forward and reverse direction. Another embodiment may include two or more blocks of arrows for each of the forward and reverse directions.

Generally, the different varieties of control buttons displayed as included in FIG. 14 include a feature such that the speed and direction may be controlled by instant on/off with a mouse cursor, for example, entering or leaving a display icon corresponding to the user control area. The user controls determine the speed and direction of a presentation in which the movement of the mouse cursor, for example, over a spatial area of the screen starts the presentation of a sequence of multimedia data items. Movement within a spatial area corresponding to the directional arrow determines the speed of the presentation. Subsequently, movement away from the spatial area corresponding to the user control arrow stops the presentation. Generally, the mouse over the arrow button area serves as a trigger for starting a temporal sequence and the mouse leaving this predetermined area causes the presentation of the multimedia data items to cease. This is in direct contrast to prior designs which require mouse clicks, for example, indicating users selection to start and stop display. With a rapid display of objects or images in the presentation area, users invariably may pass their intended stop location prior to physically depressing and selecting via the mouse control.

In the previously described user interfaces and browsing tool, the use of two or more synchronized displays provides a traversal in browsing of multimedia data items in a hierarchical structure. The presentation of the multimedia data items is generally controlled temporally with forward and backward and faster and slower controls for the purpose of content selection or assessment. The multimedia-based content of the individual items in this sequence may be rendered in a designated spatial container. Generally, multimedia data items are presented in a synchronized fashion with two or more components of the user interface, such as the menu selection or outline and the presentation area upon which multimedia data items are presented. This provides a technique for viewing or selecting a set of information object out of some larger collection. One technique was presented for grouping objects with various structure relations, such as the parent/child relation and the 3D flyby presentation.

The foregoing techniques are flexible in that they may be applied to a variety of domains of multimedia data and applications. Using combinations of the controls and the selection techniques, images and other multimedia data items may be presented for efficient selection based on content.

While the invention has been disclosed in connection with preferred embodiments shown and described in detail, various modifications and improvements thereon will become readily apparent to those skilled in the art. Accordingly, the spirit and scope of the present invention is to be limited only by the following claims.

What is claimed is:

1. A method executed in a computer system for presenting information to a user, the method comprising:
   presenting a hierarchical description of the information as a list of menu items in an outline area;
   automatically traversing the menu items of the hierarchical description;
   successively and automatically presenting one or more multimedia data items for each of the menu items in a presentation area according to a first temporal arrangement, the first temporal arrangement of said one or more multimedia data items in said presentation area being synchronized with the hierarchical description;
   permitting the user to dynamically control direction of said successive and automatic presentation of the one or more multimedia data items in said presentation area to cause said successive and automatic presentation of the one or more multimedia data items in said presentation area to occur in forward and reverse directions under control of the user; and
   permitting the user to dynamically control speed of said successive and automatic presentation of the one or more multimedia data items in said presentation area to cause said successive and automatic presentation of the one or more multimedia data items in said presentation area to occur at slow and fast speeds under control of the user.

2. The method of claim 1, further including:
   presenting said one or more multimedia data items in said presentation area according to a second temporal arrangement; and
   synchronizing said hierarchical description in accordance with said second temporal arrangement by updating said outline area.

3. The method of claim 1, further including:
   indicating a current focus by signifying a portion of said outline area being synchronized in accordance with said one or more multimedia data items of said presentation area.

4. The method of claim 3, wherein said current focus is indicated by highlighting a portion of said outline area.

5. The method of claim 3, wherein said current focus is indicated by associating an iconic indicator with a portion of said outline area.

6. The method of claim 5, wherein said iconic indicator is an arrow located near said portion of said outline area.

7. The method of claim 3, wherein said current focus is indicated by bolding a portion of said outline area.

8. The method of claim 3, wherein said current focus is indicated by making a portion of said outline area a different font from other portions of said outline area.

9. The method of claim 3, wherein said current focus is indicated by making a portion of said outline area a different color from other portions of said outline area.

10. The method of claim 1, wherein said direction and speed are controlled in accordance with the location of a selection device indicator with respect to a predetermined area of a display device.

11. The method of claim 10, wherein said selection device indicator is a mouse cursor, said predetermined area of a display device is identified by an icon, and the method further includes:

changing the speed and direction in which multimedia data items are presented in the presentation area when the mouse cursor is within said predetermined area identified by the icon; and stopping modification to the presentation area when the mouse cursor is not within said predetermined area.

12. The method of claim 11, wherein said icon includes two or more arrows, a first one of said arrows indicating a forward direction and a second one of said arrows indicating a reverse direction with regard to presenting multimedia data items in said presentation area, said speed increasing as the mouse cursor moves closer to a tip of one of said two or more arrows.

13. The method of claim 1, wherein said multimedia data items are presented in said presentation area using a stacking technique in which successive multimedia data items are presented slightly overlapping one or more previously presented multimedia data items, and the method further includes:

controlling speed and direction of said one or more multimedia data items presented by stacking and unstacking successively presented multimedia data items in said presentation area.

14. The method of claim 1, further including:

synchronizing other multimedia data with the presentation of said one or more multimedia data items in said presentation area and said hierarchical description in said outline area.

15. The method of claim 1, wherein said multimedia data items are presented in said presentation area using a scrolling technique in which successive images are presented in a two-dimensional plane, and the method further includes:

controlling speed and direction of said one or more multimedia data items by controlling the direction and speed at which said one or more multimedia data items are presented in said two-dimensional plane.

16. The method of claim 1, wherein said multimedia data items are presented in said presentation area using a three-dimensional presentation technique in which said multimedia data items are presented with a three-dimensional perspective with regard to a display viewpoint at a particular time.

17. The method of claim 16, wherein said three-dimensional presentation technique includes predetermining locations associated with said one or more multimedia data items in a defined area and determining a display viewpoint in a two-dimensional plane with respect to said locations associated with said one or more multimedia data items.

18. The method of claim 17, wherein one or more groups of the multimedia data items are positioned in said two-dimensional plane.

19. The method of claim 18 further including, for each of said one or more groups of multimedia data items:

placing one or more of the multimedia data items equidistant from other ones of the multimedia data items in a counterclockwise direction, each of said multimedia data items being in a circular arrangement such that the center of each of the multimedia data items in said each group is located on a circumference of a circle corresponding to the circular arrangement.

20. The method of claim 19, wherein subsequent groups each have a first multimedia data item that is placed at a random angular offset relative to a first multimedia data item of an initial one of said one or more groups.

21. The method of claim 1, wherein some of said one or more multimedia data items includes a group of one or more images having a parent-child relationship in which there is one parent multimedia data item and one or more child multimedia data items, the method further including:

dividing said presentation area into four quadrants;

presenting said parent multimedia data item near the center of said presentation area;

presenting subsequent child multimedia data items beginning with an upper left quadrant and proceeding to present successive multimedia data items on a clockwise rotation in successive quadrants.

22. The method of claim 21, wherein each of said four quadrants is further divided into four subquadrants, each of said four quadrants have an outermost subquadrant corresponding to an outermost corner of said quadrant with respect to said presentation area, each of said child multimedia data items being presented in an outermost subquadrant associated with a quadrant, an outer corner of said each child multimedia data item being randomly located within said outermost subquadrant.

23. The method of claim 1, further including:

providing a user interface that includes said outline area, said presentation area and a control area.

24. The method of claim 23, further including:

producing said user interface by executing a translation tool that produces software used to provide said user interface.

25. The method of claim 24, further including:

issuing a request from a client causing execution of said producing step on a server.

26. The method of claim 25, further including, performing on said server, in response to issuing a request:

loading user interface components onto said server, said user interface components including a translation tool;

loading a hierarchical data file onto said server;

executing said user interface components using said hierarchical data file as an input to said translation tool producing one or more software components, each of said one or more software components being associated with presenting said one or more multimedia data items in said presentation area.

27. The method of claim 26, further including:

transferring said one or more software components to said client;

executing, on said client, a driver causing said user interface to be displayed and causing images and multimedia files to be loaded on said client.

28. The method of claim 27, wherein said images and multimedia files are loaded into memory prior to accepting user input via said user interface in accordance with said software components.

29. The method of claim 1, wherein said outline area includes a nested hierarchical display wherein an outer nesting depth header is displayed when a corresponding inner nesting depth header is a current focus of said presentation area, said current focus representing a synchronization of said outline area with said presentation area at a particular time.

30. The method of claim 1, wherein said one or more multimedia data items include one or more images.

31. The method of claim 1, wherein said one or more multimedia data items include one or more audio files.

32. The method of claim 1, wherein said one or more multimedia data items include one or more video files.

33. An apparatus for presenting information to a user, the apparatus comprising:

machine executable code for displaying a hierarchical description of the information as a list of menu items in an outline area;

machine executable code for automatically traversing the menu items of the hierarchical description;

machine executable code for successively and automatically presenting one or more multimedia data items for each of the menu items in a presentation area according to a first temporal arrangement, the first temporal arrangement of said one or more multimedia data items in said presentation area being synchronized with the hierarchical description;

machine executable code for permitting the user to dynamically control direction of said successive and automatic presentation of the one or more multimedia data items in said presentation area to cause said successive and automatic presentation of the one or more multimedia data items in said presentation area to occur in forward and reverse directions under control of the user; and machine executable code for permitting the user to dynamically control speed of said successive and automatic presentation of the one or more multimedia data items in said presentation area to cause said successive and automatic presentation of the one or more multimedia data items in said presentation area to occur at slow and fast speeds under control of the user.

34. The apparatus of claim 33, further including:

machine executable code for presenting said one or more multimedia data items in said presentation area according to a second temporal arrangement; and machine executable code for synchronizing said hierarchical description in accordance with said second temporal arrangement by updating said outline area.

35. The apparatus of claim 33, further including:

machine executable code for indicating a current focus by signifying a portion of said outline area being synchronized in accordance with said one or more multimedia data items of said presentation area.

36. The apparatus of claim 35, wherein said current focus is indicated by highlighting a portion of said outline area.

37. The apparatus of claim 35, wherein said current focus is indicated by associating an iconic indicator with a portion of said outline area.

38. The apparatus of claim 37, wherein said iconic indicator is an arrow located near said port of said outline area.

39. The apparatus of claim 35, wherein said current focus is indicated by bolding a portion of said outline area.

40. The apparatus of claim 35, wherein said current focus is indicated by making a portion of said outline area a different font from other portions of said outline area.

41. The apparatus of claim 35, wherein said current focus is indicated by making a portion of said outline area a different color from other portions of said outline area.

42. The apparatus of claim 33, wherein said direction and speed are controlled in accordance with the location of a selection device indicator with respect to a predetermined area of a display device.

43. The apparatus of claim 42, wherein said selection device indicator is a mouse cursor, said predetermined area of a display device is identified by an icon, and the apparatus further includes:

machine executable code for changing the speed and direction in which multimedia data items are presenting in the presentation area when the mouse cursor is within said predetermined area identified by the icon; and machine executable code for stopping modification to the presentation area when the mouse cursor is not within said predetermined area.

44. The apparatus of claim 43, wherein said icon includes two or more arrows, a first one of said arrows indicating a forward direction and a second one of said arrows indicating a reverse direction with regard to presenting multimedia data items in said presentation area, said speed increasing as the mouse cursor moves closer to a tip of one of said two or more arrows.

45. The apparatus of claim 33, wherein said multimedia data items are presented in said presentation area using a stacking technique in which successive multimedia data items are presented slightly overlapping one or more previously presented multimedia data items, and the apparatus further includes:

machine executable code for controlling speed and direction of said one or more multimedia data items presented by stacking and unstacking successively presented multimedia data items in said presentation area.

46. The apparatus of claim 33, further including:

machine executable code for synchronizing a multimedia file with the presentation of said one or more multimedia data items in said presentation area and said hierarchical description in said outline area.

47. The apparatus of claim 33, wherein said multimedia data items are presented in said presentation area using a scrolling technique in which successive ones of the multimedia data items are presented in a two-dimensional plane, and the apparatus further includes:

machine executable code for controlling speed and direction of said one or more multimedia data items by controlling the direction and speed at which said one or more multimedia data items are presented in said two-dimensional plane.

48. The apparatus of claim 33, wherein said multimedia data items are presented in said presentation area using a three-dimensional presentation technique in which multimedia data items are presented user with a three-dimensional perspective with regard to a display viewpoint at a particular time.

49. The apparatus of claim 48, wherein said three-dimensional presentation technique includes predetermining locations associated with said one or more multimedia data items in a defined area and determining a presentation viewpoint in a two-dimensional plane with respect to said locations associated with said one or more multimedia data items.

50. The apparatus of claim 49, wherein one or more groups of the multimedia data items are positioned in said two-dimensional plane.

51. The apparatus of claim 50 further including, for each of said one or more groups of multimedia data items:

machine executable code for placing one or more of the multimedia data items equidistant from other ones of the multimedia data items in a counterclockwise direction, each of said multimedia data items being in a circular arrangement such that the center of each of the multimedia data items in said each group is located on a circumference of a circle corresponding to the circular arrangement.

52. The apparatus of claim 51, wherein subsequent groups each have a first multimedia data item that is placed at a random angular offset relative to a first multimedia data item of an initial one of said one or more groups.

53. The apparatus of claim 33, wherein some of said one or more multimedia data items includes a group of one or more multimedia data items having a parent-child relationship in which there is one parent multimedia data item and one or more child multimedia data items, the apparatus further including:

machine executable code for dividing said presentation area into four quadrants;

machine executable code for presenting said parent multimedia data item near the center of said presentation area;

machine executable code for presenting subsequent child multimedia data items beginning with an upper left quadrant and proceeding to present successive multimedia data items on a clockwise rotation in successive quadrants.

54. The apparatus of claim 53, wherein each of said four quadrants is further divided into four subquadrants, each of said four quadrants have an outermost subquadrant corresponding to an outermost corner of said quadrant with respect to said presentation area, each of said child multimedia data items being presented in an outermost subquadrant associated with a quadrant, an outer corner of said each child multimedia data item being randomly located within said outermost subquadrant.

55. The apparatus of claim 33 further including:

machine executable code for providing a user interface that includes said outline area, said presentation area and a control area.

56. The apparatus of claim 55, further including:

machine executable code for producing said user interface by executing a translation tool that produces software used to provide said user interface.

57. The apparatus of claim 56, further including:

machine executable code for issuing a request from a client causing execution of said producing step on a server.

58. The apparatus of claim 57, further including, machine executable code executable on said server in response to said client issuing a request for:

loading user interface components onto said server, said user interface components including a translation tool;

loading a hierarchical data file onto said server; and executing said user interface components using said hierarchical data file as an input to said translation tool producing one or more software components, each of said one or more software components being associated with displaying said one or more multimedia data items in said presentation area.

59. The apparatus of claim 58, further including:

machine executable code for transferring said one or more software components to said client;

machine executable code included in said client for causing said user interface to be displayed and causing images and multimedia files to be loaded on said client.

60. The apparatus of claim 59, wherein said images and multimedia files are loaded into memory prior to accepting user input via said user interface in accordance with said software components.

61. The apparatus of claim 33, wherein said outline area includes a nested hierarchical display wherein an outer nesting depth header is displayed when a corresponding inner nesting depth header is a current focus of said presentation area, said current focus representing a synchronization of said outline area with said presentation area at a particular time.

62. The apparatus of claim 33, wherein said one or more multimedia data items include one or more images.

63. The apparatus of claim 33, wherein said one or more multimedia data items include one or more audio files.

64. The apparatus of claim 33, wherein said one or more multimedia data items include one or more video files.

65. An apparatus for presenting information to a user, the apparatus comprising:

means for displaying a hierarchical description of the information as a list of menu items in an outline area;

means for automatically traversing the menu items of the hierarchical description;

means for successively and automatically presenting one or more multimedia data items for each of the menu items in a presentation area according to a first temporal arrangement, the first temporal arrangement of said one or more multimedia data items in said presentation area being synchronized with the hierarchical description;

means for allowing the user to dynamically control direction of said successive and automatic presentation of the one or more multimedia data items in said presentation area to cause said successive and automatic presentation of the one or more multimedia data items in said presentation area to occur in forward and reverse directions under control of the user; and means for allowing the user to dynamically control speed of said successive and automatic presentation of the one or more multimedia data items in said presentation area to cause said successive and automatic presentation of the one or more multimedia data items in said presentation area to occur at slow and fast speeds under control of the user.

66. The apparatus of claim 65, further including:

means for presenting said one or more multimedia data items in said presentation area according to a second temporal arrangement; and means for synchronizing said hierarchical description in accordance with said second temporal arrangement by updating said outline area.

67. The apparatus of claim 65, further including:

means for indicating a current focus by signifying a portion of said outline area being synchronized in accordance with said one or more multimedia data items of said presentation area.

68. The apparatus of claim 67, wherein said current focus is indicated by highlighting a portion of said outline area.

69. The apparatus of claim 67, wherein said current focus is indicated by associating an iconic indicator with a portion of said outline area.

70. A method of selecting items to purchase in electronic commerce comprising:

presenting a hierarchical description of items for sale in an outline area;

automatically traversing the items for sale of the hierarchical description;

automatically and successively presenting one or more multimedia data items for each of said items for sale in a presentation area according to a first temporal arrangement, the first temporal arrangement of said one or more multimedia data items in said presentation area being synchronized with the hierarchical description;

permitting a user to dynamically control direction of said automatic and successive presentation of the one or more multimedia data items in said presentation area to cause said automatic and successive presentation of the one or more multimedia data items in said presentation area to occur in forward and reverse directions under control of the user;

permitting a user to dynamically control speed of said automatic and successive presentation of the one or more multimedia data items in said presentation area to cause said automatic and successive presentation of the one or more multimedia data items in said presentation area to occur at slow and fast speeds under control of the user; and receiving selection from the user of:one of said items for sale via selection of one of said one or more multimedia data items corresponding to said one or more items selected.

71. The method of claim 70, further including:

selecting one of said multimedia data items.

72. The method of claim 70, further including:

presenting an icon associated with an item for sale corresponding to a hyperlink related to said item for sale.

73. An apparatus for selecting items for purchase in electronic commerce comprising.

machine executable code for presenting a hierarchical description of items for sale in an outline area;

machine executable code for automatically traversing the items for sale of the hierarchical description;

machine executable code for automatically and successively presenting one or more multimedia data items for each of said items for sale in a presentation area according to a first. temporal arrangement, the first temporal arrangement of said one or more multimedia data items in said presentation area being synchronized with the hierarchical description;

machine executable code for allowing a user to dynamically control direction of said automatic and successive presentation of the one or more multimedia data items in said presentation area to cause said automatic and successive presentation of the one or more multimedia data items in said presentation area to occur in forward aid reverse directions under control of the user;

machine executable code for allowing a user to dynamically control speed of said automatic and successive presentation of the one or more multimedia data items in said presentation area to cause said automatic and successive presentation of the one or more multimedia data items in said presentation area to occur at slow and fast speeds under control of the user; and machine executable code for obtaining selection from the user of one of said items for sale via selection of one of said one or more multimedia data items corresponding to said one or more items selected.

74. The apparatus of claim 73, further including:

machine executable code for selecting one of said multimedia data items.

75. The apparatus of claim 73, further including:

machine executable code for presenting an icon associated with an item for sale corresponding to a hyperlink related to said item for sale.

* * * * *